US011869427B2

(12) United States Patent
Hohjoh

(10) Patent No.: US 11,869,427 B2
(45) Date of Patent: Jan. 9, 2024

(54) DISPLAY DEVICE

(71) Applicant: SHARP KABUSHIKI KAISHA, Sakai (JP)

(72) Inventor: Naohiro Hohjoh, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 15 days.

(21) Appl. No.: 17/767,658

(22) PCT Filed: Oct. 17, 2019

(86) PCT No.: PCT/JP2019/040904
§ 371 (c)(1),
(2) Date: Apr. 8, 2022

(87) PCT Pub. No.: WO2021/075028
PCT Pub. Date: Apr. 22, 2021

(65) Prior Publication Data
US 2023/0140579 A1 May 4, 2023

(51) Int. Cl.
*G09G 3/3233* (2016.01)

(52) U.S. Cl.
CPC ... *G09G 3/3233* (2013.01); *G09G 2300/0426* (2013.01); *G09G 2300/0819* (2013.01); *G09G 2300/0852* (2013.01); *G09G 2310/0202* (2013.01); *G09G 2310/08* (2013.01); *G09G 2320/0261* (2013.01); *G09G 2320/045* (2013.01)

(58) Field of Classification Search
None
See application file for complete search history.

(56) References Cited

U.S. PATENT DOCUMENTS

2012/0293479 A1* 11/2012 Han .................... H04N 13/341 345/212

FOREIGN PATENT DOCUMENTS

JP 2007-256728 A 10/2007

* cited by examiner

*Primary Examiner* — Ifedayo B Iluyomade
(74) *Attorney, Agent, or Firm* — ScienBiziP, P.C.

(57) ABSTRACT

This display device according to an aspect of the disclosure includes a pixel circuit including: a drive transistor configured to control an electric current for a light-emitting element; a switching circuit; and a first capacitive element and a second capacitive element both connected to the switching circuit, wherein the switching circuit connects the first capacitive element to a control terminal of the drive transistor in a first period that falls within a single frame period and connects the second capacitive element to the control terminal of the drive transistor in a second period that falls within the single frame period and that follows the first period.

18 Claims, 19 Drawing Sheets

(a)

(b)

(a)

(b)

(a)

(b)

(a)

(b)

DISPLAY DEVICE

TECHNICAL FIELD

The disclosure relates to display devices.

BACKGROUND ART

Patent Literature 1 discloses an impulse drive technique to address blurry moving images in a display device including light-emitting elements.

CITATION LIST

Patent Literature

Patent Literature 1: Japanese Unexamined Patent Application Publication, Tokukai, No. 2007-256728

SUMMARY

Technical Problem

Performing impulse drive in a display device including light-emitting elements as in Patent Literature 1 undesirably prompts degradation of the light-emitting elements due to high-luminance emission.

Solution to Problem

The disclosure, in one aspect thereof, is directed to a display device including: a plurality of data signal lines connected to a data signal line drive circuit; a plurality of scan signal lines connected to a scan signal line drive circuit and intersecting with the plurality of data signal lines; and a plurality of pixel circuits at respective intersections of the plurality of data signal lines and the plurality of scan signal lines, wherein each of the plurality of pixel circuits includes: a current-driven light-emitting element; a drive transistor configured to control an electric current for the light-emitting element; a switching circuit; and a first capacitive element and a second capacitive element both connected to the switching circuit, and the switching circuit connects the first capacitive element to a control terminal of the drive transistor in a first period that falls within a single frame period and connects the second capacitive element to the control terminal of the drive transistor in a second period that falls within the single frame period and that follows the first period.

Advantageous Effects

The disclosure, in an aspect thereof, can improve the quality of displays (especially, moving image displays) while restraining degradation of the light-emitting elements.

BRIEF DESCRIPTION OF DRAWINGS

FIG. 1(*b*) is a cross-sectional view of a display area.

FIG. 2(*b*) is a timing chart illustrating a method of driving a pixel circuit.

FIG. 3(*c*) is a table in accordance with a comparative example.

FIG. 10(*b*) is a timing chart illustrating a method of driving a pixel circuit.

FIG. 11(*b*) is a timing chart illustrating a method of driving the pixel circuit.

FIG. 18(*b*) is a graph representing corrected data voltage characteristics (when luminance is not capped at high gray levels).

FIG. 19(*b*) is a graph representing corrected data voltage characteristics (when luminance is capped at high gray levels).

DESCRIPTION OF EMBODIMENTS

Embodiment 1

Figure 1:
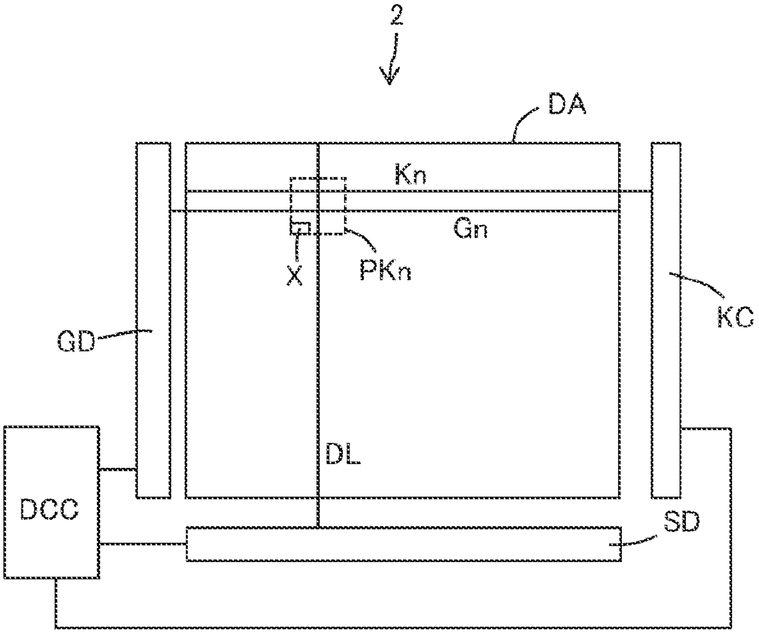
FIG. 1(*a*) is a schematic plan view of a display device in accordance with Embodiment 1.
Figure 1:
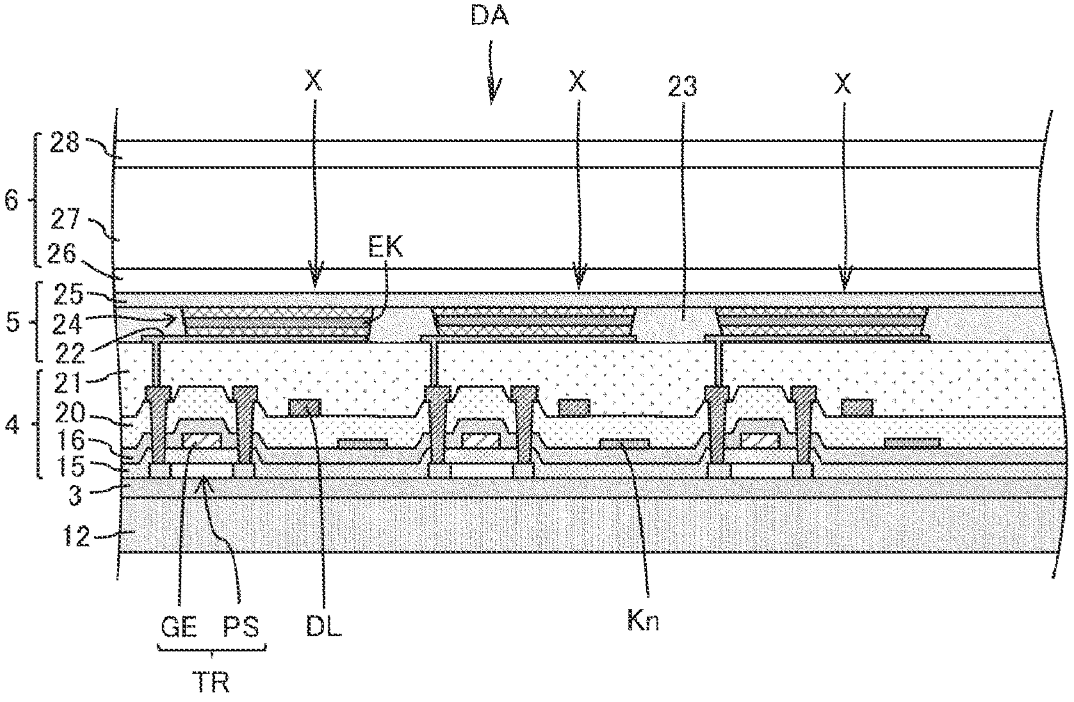

FIG. 1(*a*) is a schematic plan view of a display device in accordance with Embodiment 1. FIG. 1(*b*) is a cross-sectional view of a display area. Referring to FIG. 1, a display device 2 includes a display area DA, a data signal line drive circuit SD, a scan signal line drive circuit GD, a switching signal generation circuit KC, and a display control circuit DCC for controlling the data signal line drive circuit SD, the scan signal line drive circuit GD, and the switching signal generation circuit KC.

In the display area DA are there provided a plurality of pixel circuits (including a pixel circuit PKn), a plurality of data signal lines (including a data signal line DL), a plurality of scan signal lines (including a scan signal line Gn) intersecting with the plurality of data signal lines, and a plurality of switching signal lines (including a switching signal line Kn). The plurality of data signal lines is connected to the data signal line drive circuit SD. The plurality of scan signal lines is connected to the scan signal line drive circuit GD. The plurality of switching signal lines is connected to the switching signal generation circuit KC.

Referring to FIG. 1, the display device 2 includes a barrier layer 3, a thin film transistor layer 4, a top-emission (light is emitted toward an upper layer) light-emitting element layer 5, and a sealing layer 6, all of which are provided on a substrate 12 in this order. There is provided a plurality of pixel circuits each including a light-emitting element X in the display area DA.

The substrate 12 is a glass substrate or a flexible base member composed primarily of a polyimide or other like resin. The substrate 12 may include, for example, two polyimide films and an inorganic film sandwiched between these polyimide films. The barrier layer (undercoat layer) 3 is an inorganic insulation layer for preventing foreign objects such as water and oxygen from reaching inside and may contain, for example, silicon nitride or silicon oxide.

Still referring to FIG. 1, the thin film transistor layer 4 includes: a semiconductor layer PS overlying the barrier layer 3; a gate insulation film 16 overlying the semiconductor layer PS; a first metal layer (containing a gate electrode GE and the scan signal line Gn) overlying the gate insulation film 16; a first interlayer insulation film 18 overlying the first metal layer; a second metal layer (containing the switching signal line Kn) overlying the first interlayer insulation film 18; a second interlayer insulation film 20 overlying the second metal layer; a third metal layer (containing the data signal line DL) overlying the second interlayer insulation film 20; and a planarization film 21 overlying the third metal layer.

The semiconductor layer PS is, for example, a low-temperature polysilicon (LTPS). A transistor TR is constructed including the gate electrode GE and the semiconductor layer PS. The semiconductor layer PS may be a conductor, except for the channel of the transistor.

The first metal layer, the second metal layer, and the third metal layer are made of, for example, a monolayer or multilayer film of at least one of metals of aluminum, tungsten, molybdenum, tantalum, chromium, titanium, and copper.

The gate insulation film 16, the first interlayer insulation film 18, and the second interlayer insulation film 20 may be made of, for example, a silicon oxide (SiOx) film or a silicon nitride (SiNx) film formed by CVD or a stack of these films. The planarization film 21 may be made of, for example, an organic material, such as a polyimide or an acrylic resin, that can be provided by printing or coating technology.

The light-emitting element layer 5 includes: a first electrode (anode) 22 overlying the planarization film 21; an insulating edge cover film 23 covering the edge of the first electrode 22; an OLED (organic light-emitting diode) layer 24 overlying the edge cover film 23; and a second electrode (upper electrode) 25 overlying the OLED layer 24. The edge cover film 23 is formed by patterning an applied organic material such as a polyimide or an acrylic resin by photolithography.

Referring again to FIG. 1, the light-emitting element layer 5 includes, for example, the light-emitting elements X that emit light of different colors. Each light-emitting element includes the insular, first electrode 22, the OLED layer 24 (containing a light-emitting layer EK), and the second electrode 25. The second electrode 25 is a common electrode provided commonly to a plurality of light-emitting elements.

The light-emitting element X may be, for example, an OLED (organic light-emitting diode) including an organic layer as a light-emitting layer or a QLED (quantum-dot light-emitting diode) including a quantum-dot layer as a light-emitting layer.

The OLED layer 24 includes, for example, a stack of a hole injection layer, a hole transport layer, the light-emitting layer EK, an electron transport layer, and an electron injection layer, all of which are provided in this order when viewed from below. The light-emitting layer is provided in openings in the edge cover film 23 (for each subpixel) in an insular manner by vapor deposition, inkjet technology, or photolithography. The other layers are provided in an insular manner or across the display area (as a common layer). One or more of the hole injection layer, the hole transport layer, the electron transport layer, and the electron injection layer may be omitted.

The first electrode 22 includes, for example, a stack of ITO (indium tin oxide) and either Ag (silver) or a Ag-containing alloy, so that the first electrode 22 can reflect light. The second electrode 25 (cathode) may be made of, for example, a thin film of a metal such as a magnesium-silver alloy, so that the second electrode 25 can transmit light.

If the light-emitting element X is an OLED, holes and electrons recombine in the light-emitting layer EK owing to the drive current flowing between the first electrode 22 and the second electrode 25, to produce excitons that fall to the ground state to emit light. If the light-emitting element X is a QLED, holes and electrons recombine in the light-emitting layer EK owing to the drive current flowing between the first electrode 22 and the second electrode 25, to produce excitons that transit from the conduction band energy level (conduction band) to the valence band energy level (valence band) of quantum dots to emit light.

The sealing layer 6, covering the light-emitting element layer 5, prevents foreign objects such as water and oxygen from reaching the light-emitting element layer 5 and may include, for example, two inorganic sealing films 26 and 28 and an organic film 27 sandwiched between the inorganic sealing films 26 and 28.

Figure 2:
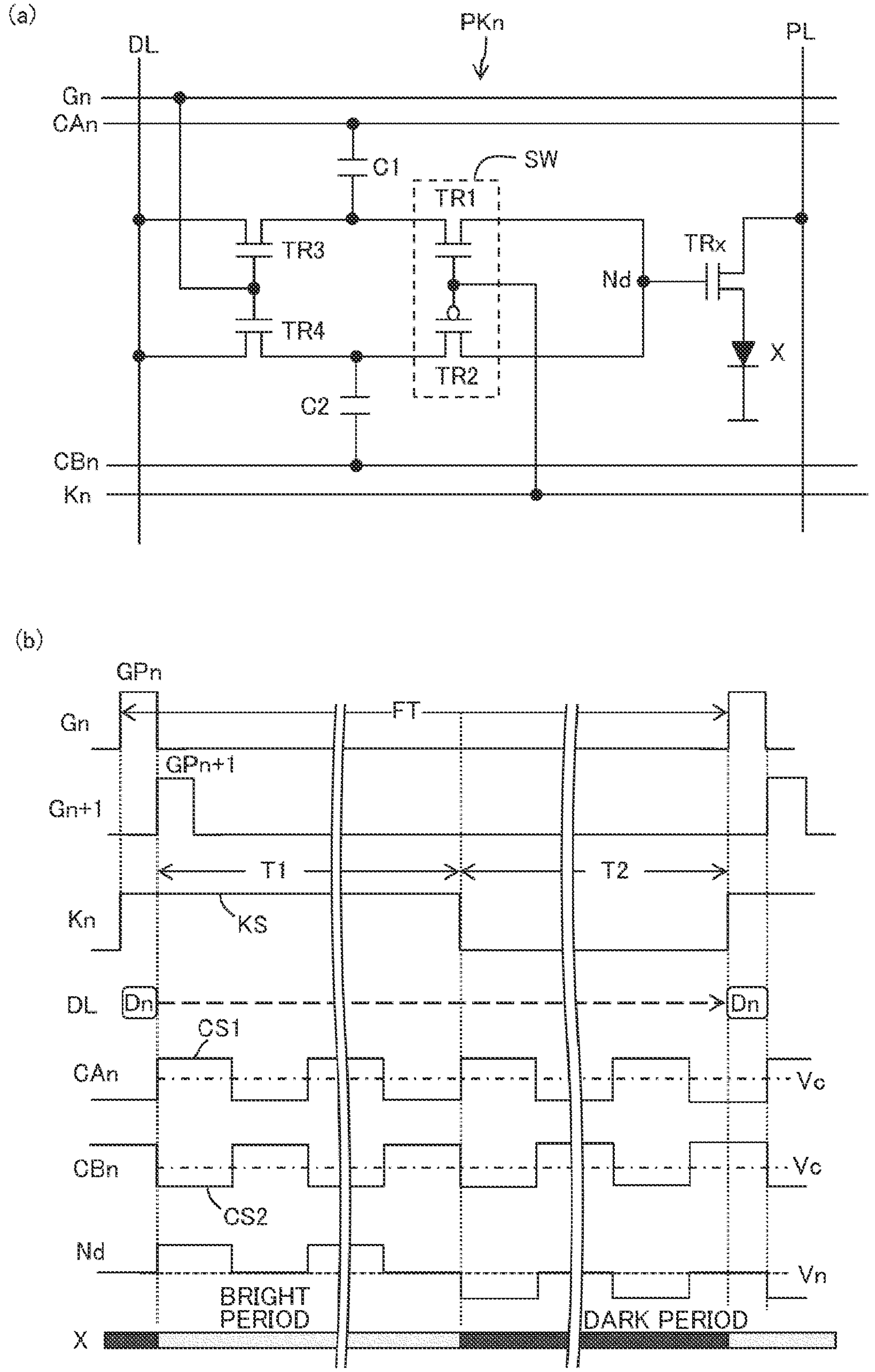
FIG. 2(*a*) is a pixel circuit diagram in accordance with Embodiment 1.

FIG. 2(*a*) is a pixel circuit diagram in accordance with Embodiment 1. FIG. 2(*b*) is a timing chart illustrating a method of driving a pixel circuit. The pixel circuit PKn includes: an associated one of the light-emitting elements X; a drive transistor TRx; a switching circuit SW including a N-type, first transistor TR1 and a P-type, second transistor TR2; a first capacitive element C1; a second capacitive element C2; a N-type, third transistor TR3; and a N-type, fourth transistor TR4.

Each light-emitting element X has an anode connected to a HIGH power supply line PL (ELVDD line) via the drive transistor TRx and a cathode connected to a LOW power supply line (ELVSS line).

The drive transistor TRx has a gate terminal Nd connected to a first electrode of the first capacitive element C1 via the first transistor TR1. The first electrode of the first capacitive element C1 is connected to the data signal line DL via the third transistor TR3. The first capacitive element C1 has a second electrode connected to a first capacitor signal line CAn.

The gate terminal Nd of the drive transistor TRx is connected to a first electrode of the second capacitive element C2 via the second transistor TR2. The first electrode of the second capacitive element C2 is connected to the data signal line DL via the fourth transistor TR4. The second capacitive element C2 has a second electrode connected to a second capacitor signal line CBn.

The first transistor TR1 and the second transistor TR2 have the gate terminals thereof connected to the switching signal line Kn. The third transistor TR3 and the fourth transistor TR4 have the gate terminals thereof connected to the current-stage scan signal line Gn. The switching signal line Kn, the first capacitor signal line CAn, and the second capacitor signal line CBn extend parallel to the scan signal line Gn.

A switching signal KS fed to the switching signal line Kn is HIGH in a first period T1 that falls within a single frame period FT and that follows a select period of the scan signal line Gn (active period of a gate pulse GPn) and LOW in a second period T2 that falls within a single frame period FT and that follows the first period T1. As a result of this particular arrangement, the switching circuit SW connects the first capacitive element C1 to a control terminal Nd of the drive transistor TRx in the first period T1 and connects the second capacitive element C2 to the control terminal Nd of the drive transistor TRx in the second period T2. The first period T1 and the second period T2, as an example, have the same length of time, and both of them are shorter than 1/60 seconds.

Both a first capacitor signal CS1 fed to the first capacitor signal line CAn and a second capacitor signal CS2 fed to the second capacitor signal line CBn periodically toggle between a first level (LOW) and a second level (HIGH) that is higher than the first level. The first level and the second level have a median value of Vc.

In FIG. 2, the first capacitor signal CS1 is at the first level (LOW), and the second capacitor signal CS2 is at the second level (HIGH), in the select period of the current-stage scan signal line Gn. The effective voltage on the gate terminal Nd of the drive transistor TRx is therefore higher than a value Vn in the first period T1 and lower than the value Vn in the second period T2. The value Vn represents pixel data Dn. Specifically, letting Vad be one half of the amplitude of CS1 and CS2 (difference between the first or second level and Vc), the effective voltage on the Nd is equal to Vn+k1×Vad in the first period T1 and equal to Vn−k2×Vad in the second period T2, where k1 is a constant in accordance with the capacitance of the first capacitive element C1 and k2 is a constant in accordance with the capacitance of the second capacitive element C2.

It is preferred that the following inequality hold to restrain the degradation of the light-emitting element X:

Signal Delay on Data Signal Line DL (Charge Period) <Period of First and Second Capacitor Signals CS1 and CS2<Signal Delay for Light-Emitting Element X (Rising Period of Electric Current).

Accordingly, when the pixel data Dn is grayscale, the effective current through the light-emitting element X is larger in the first period T1 than in the second period T2, and the effective luminance of the light-emitting element X is higher in the first period T1 than in the second period T2. The first period is a bright period, the second period is a dark period, and the average luminance of the light-emitting element X over the first period and the second period is the luminance of the pixel circuit PKn as reproduced from the pixel data Dn, in Embodiment 1.

Figure 3:
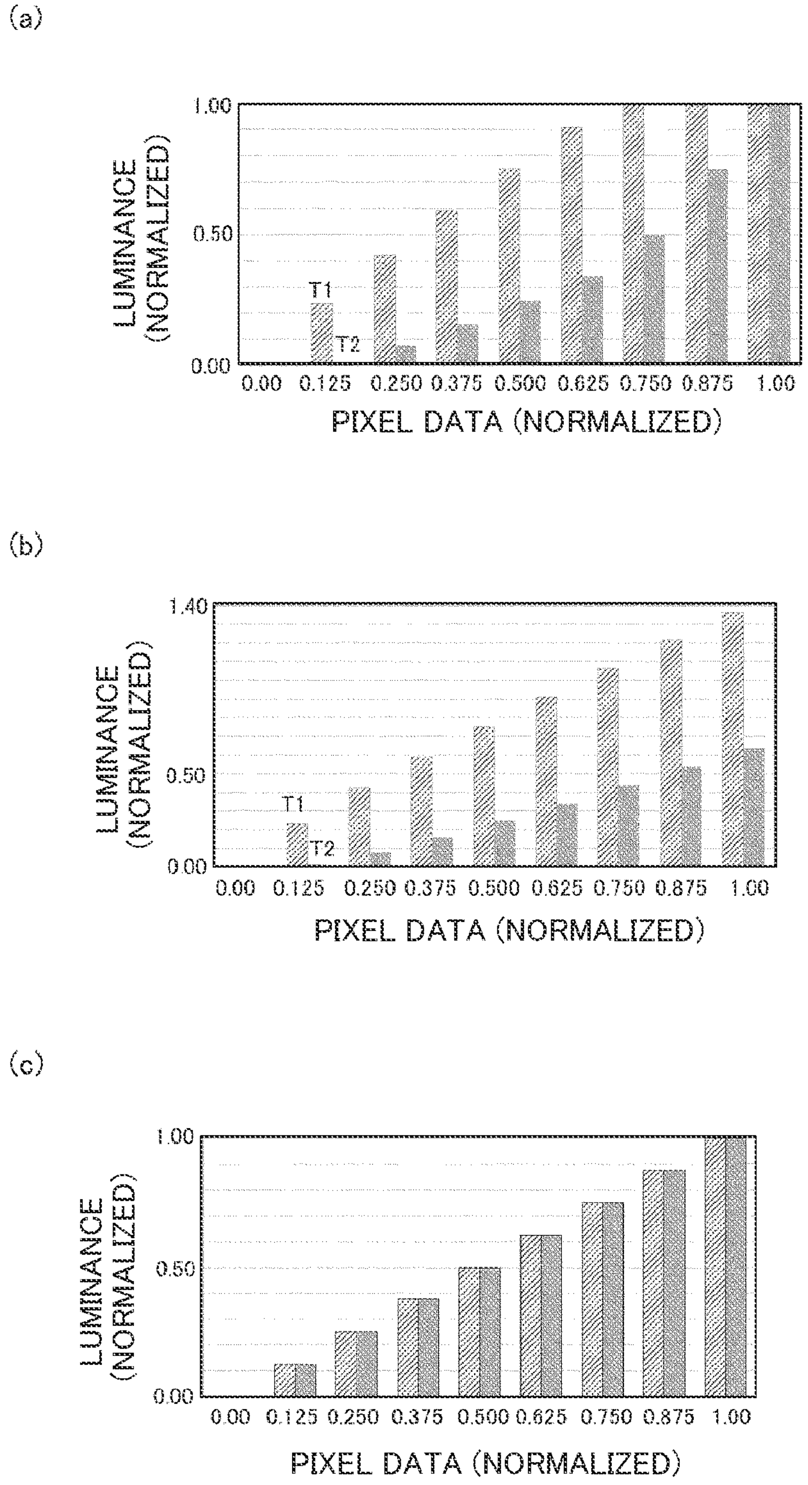
FIGS. 3(*a*) and 3(*b*) are tables of exemplary settings of pixel data and luminance for each period in accordance with Embodiment 1.

FIGS. 3(*a*) and 3(*b*) are tables of exemplary settings of pixel data and luminance for each period in accordance with Embodiment 1. FIG. 3(*c*) is a table in accordance with a comparative example. For example, the settings shown in FIG. 3(*a*) are possible if the luminance of the light-emitting element X is capped in favor of restraining element degradation. On the other hand, for example, the settings shown in FIG. 3(*b*) are possible if the luminance of the light-emitting element X is not capped in favor of display quality. The settings in FIGS. 3(*a*) and 3(*b*) better address blurry moving images than the settings in the comparative example where the luminance is held constant throughout a single frame period (see FIG. 3(*c*)) and better restrain the degradation of the light-emitting element X than impulse drive where the light-emitting element X is turned off in a part of a single frame period.

Figure 4:
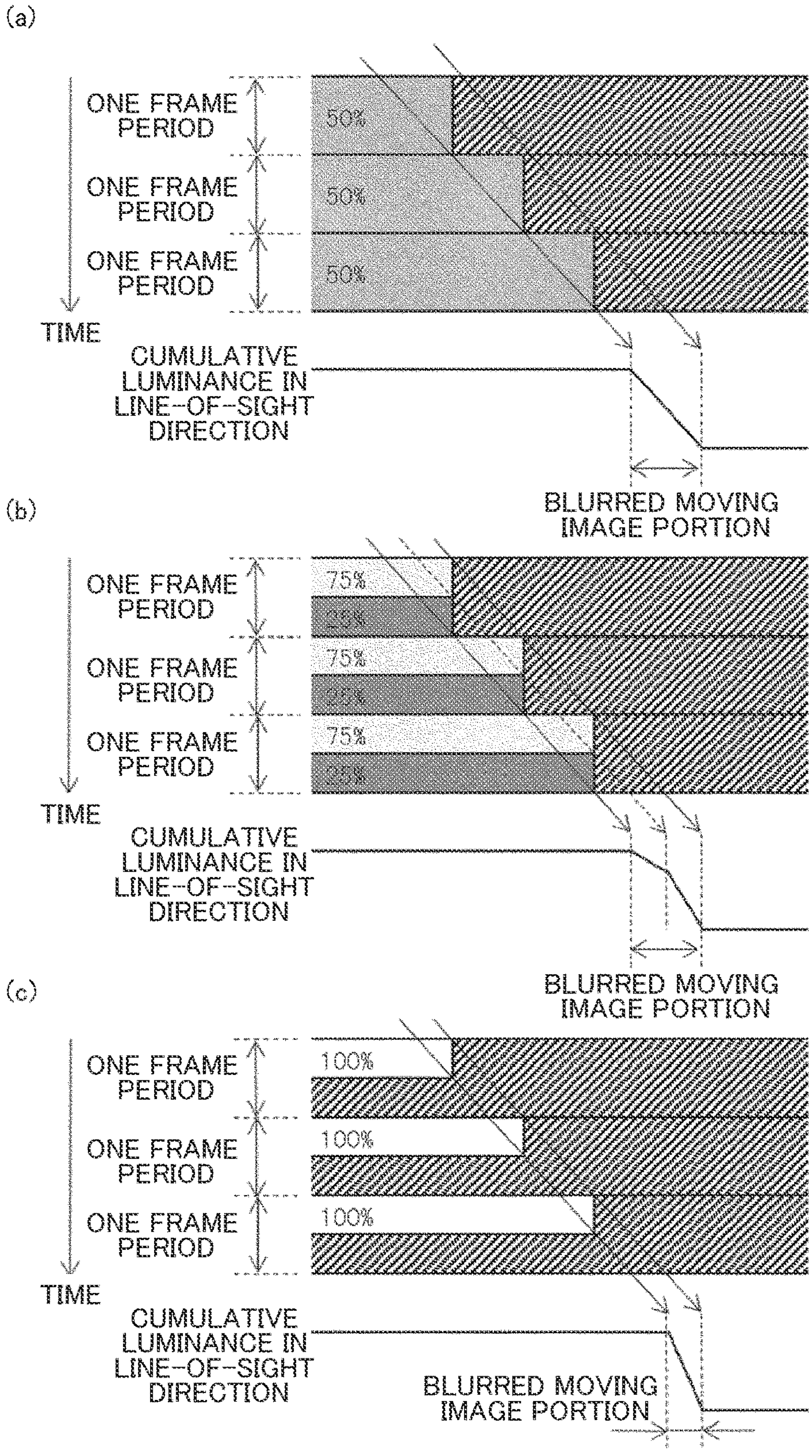
FIG. 4 is a set of diagrams showing improvements in quality of moving image displays in accordance with Embodiment 1.

FIG. 4 is a set of diagrams showing improvements in quality of moving image displays in accordance with Embodiment 1. For instance, the display of a right moving rectangle (50% luminance) contains a blurred moving image portion that is smaller in Embodiment 1 (FIG. 4(*b*)) than in conventional cases (FIG. 4(*a*) and in a case of impulse drive, close to FIG. 4(*c*))) where the luminance is held constant throughout a single frame period, which demonstrates that the display quality of the moving image has been improved.

Figure 5:
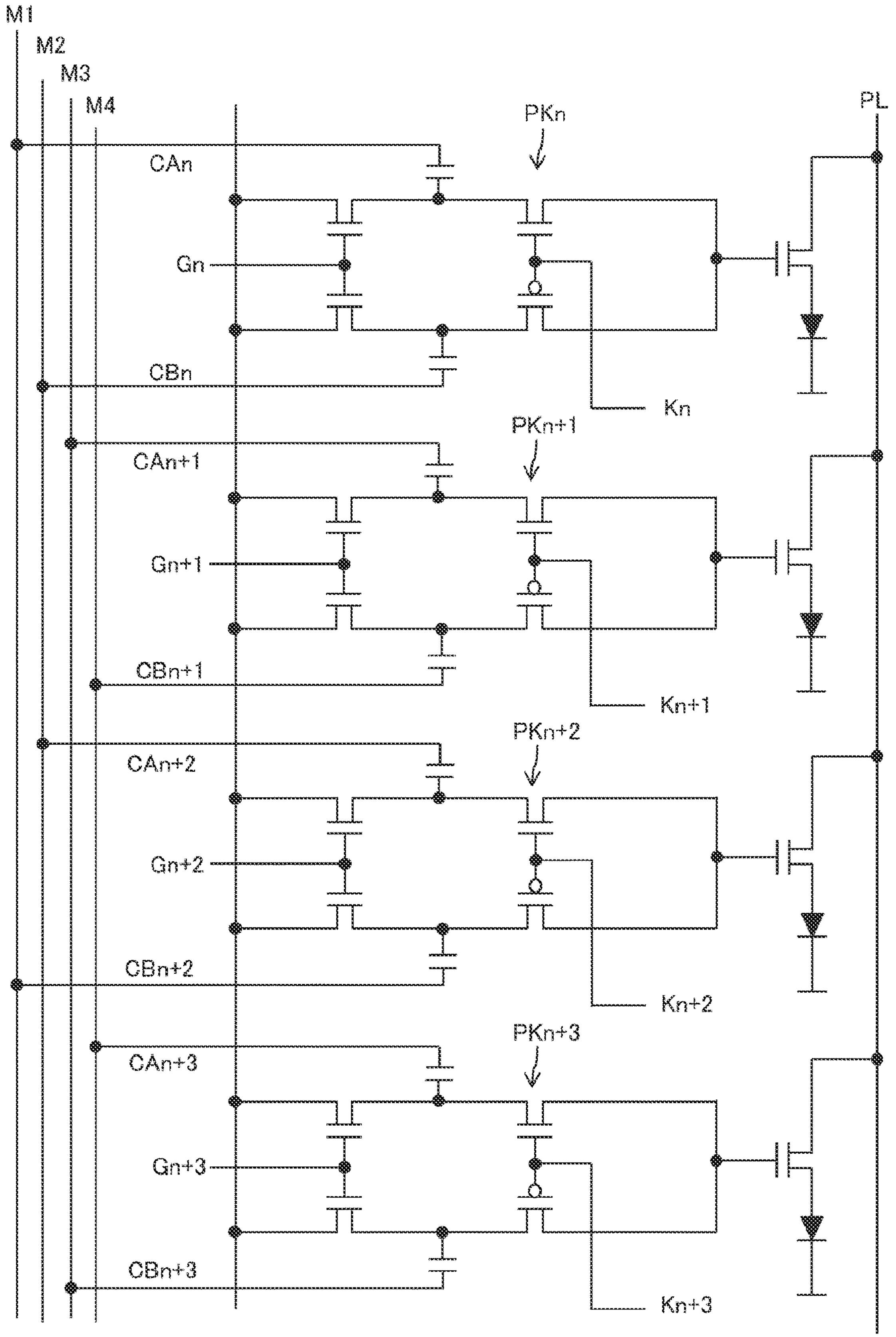
FIG. 5 is a circuit diagram showing how main lines are connected to capacitor signal lines.
Figure 6:
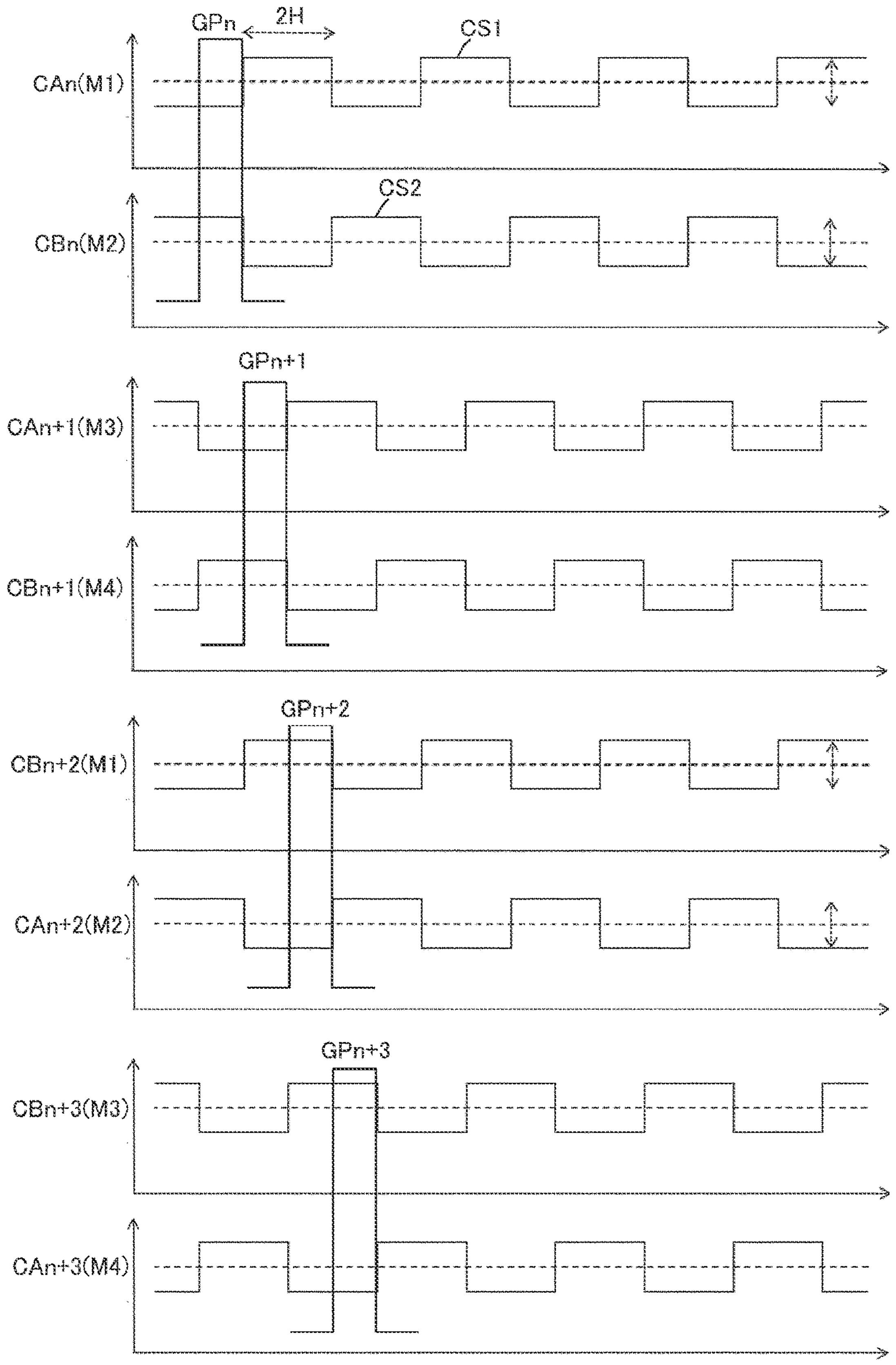
FIG. 6 is a flow chart of capacitor signals fed to capacitor signal lines and gate pulses for stages.
Figure 7:
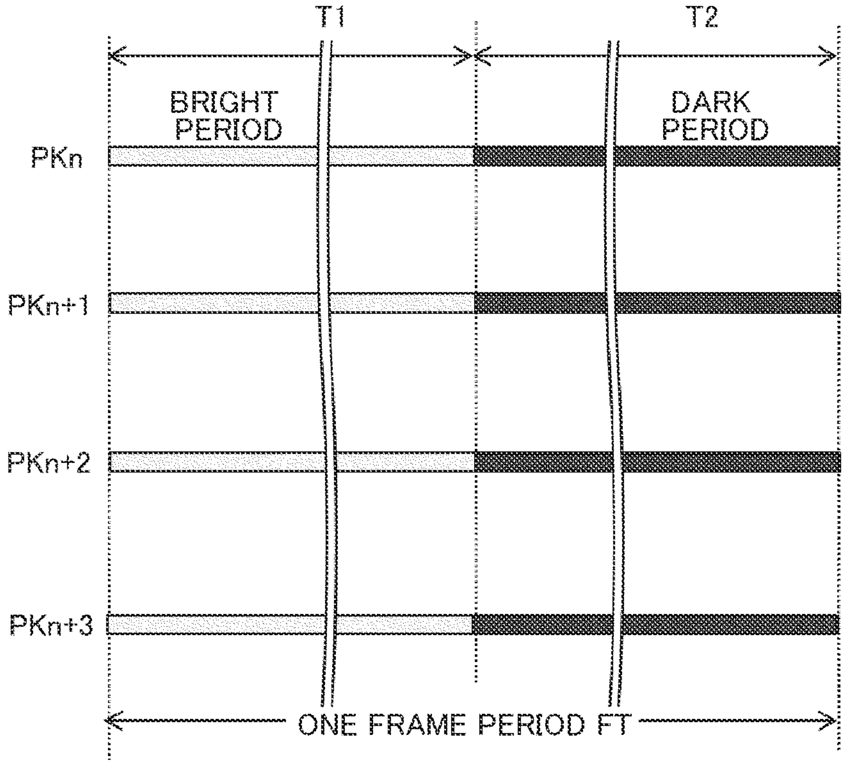
FIG. 7 is a schematic diagram of an exemplary display produced by pixel circuits.

FIG. 5 is a circuit diagram showing how main lines are connected to capacitor signal lines. FIG. 6 is a flow chart of capacitor signals fed to capacitor signal lines and gate pulses for stages. FIG. 7 is a schematic diagram of an exemplary display produced by pixel circuits.

In relation to the first capacitor signal line CAn and the second capacitor signal line CBn both connected to the pixel circuit PKn (current stage), a first capacitor signal line CAn+1 and a second capacitor signal line CBn+1 both connected to a pixel circuit PKn+1 (first succeeding stage), a first capacitor signal line CAn+2 and a second capacitor signal line CBn+2 both connected to a pixel circuit PKn+2 (second succeeding stage), and a first capacitor signal line CAn+3 and a second capacitor signal line CBn+3 both connected to a pixel circuit PKn+3 (third succeeding stage), FIG. 5 shows that the first capacitor signal line CAn and the second capacitor signal line CBn+2 are connected to a first main line M1, the second capacitor signal line CBn and the first capacitor signal line CAn+2 are connected to a second main line M2, the first capacitor signal line CAn+1 and the second capacitor signal line CBn+3 are connected to a third main line M3, and the first capacitor signal line CAn+3 and the second capacitor signal line CBn+1 are connected to a fourth main line M4.

FIG. 6 shows that the capacitor signal CS2 fed to the second main line M2 leads the capacitor signal CS1 fed to the first main line M1 by 180° (in opposite phase), the capacitor signal fed to the third main line M3 leads the capacitor signal CS1 by 90°, and the capacitor signal fed to the fourth main line M4 leads the capacitor signal CS1 by 270°.

The capacitor signal (first capacitor signal CS1) on the first capacitor signal line CAn is LOW, and the capacitor signal (second capacitor signal CS2) on the second capacitor signal line CBn is HIGH, in the active period of the gate pulse GPn. The capacitor signal on the first capacitor signal line CAn+1 is LOW, and the capacitor signal on the second capacitor signal line CBn+1 is HIGH, in the active period of a gate pulse GPn+1. The capacitor signal on the first capacitor signal line CAn+2 is LOW, and the capacitor signal on the second capacitor signal line CBn+2 is HIGH, in the active period of a gate pulse GPn+2. The capacitor signal on the first capacitor signal line CAn+3 is LOW, and the capacitor signal on the second capacitor signal line CBn+3 is HIGH, in the active period of a gate pulse GPn+3. The pixel circuits PKn, PKn+1, PKn+2, and PKn+3 are connected to the switching signal lines Kn, Kn+1, Kn+2, and Kn+3 respectively.

These connections cause the first period T1 to be a bright period and the second period T2 to be a dark period for each pixel circuit (PKn, PKn+1, PKn+2, and PKn+3) as shown in FIG. 7.

Figure 8:
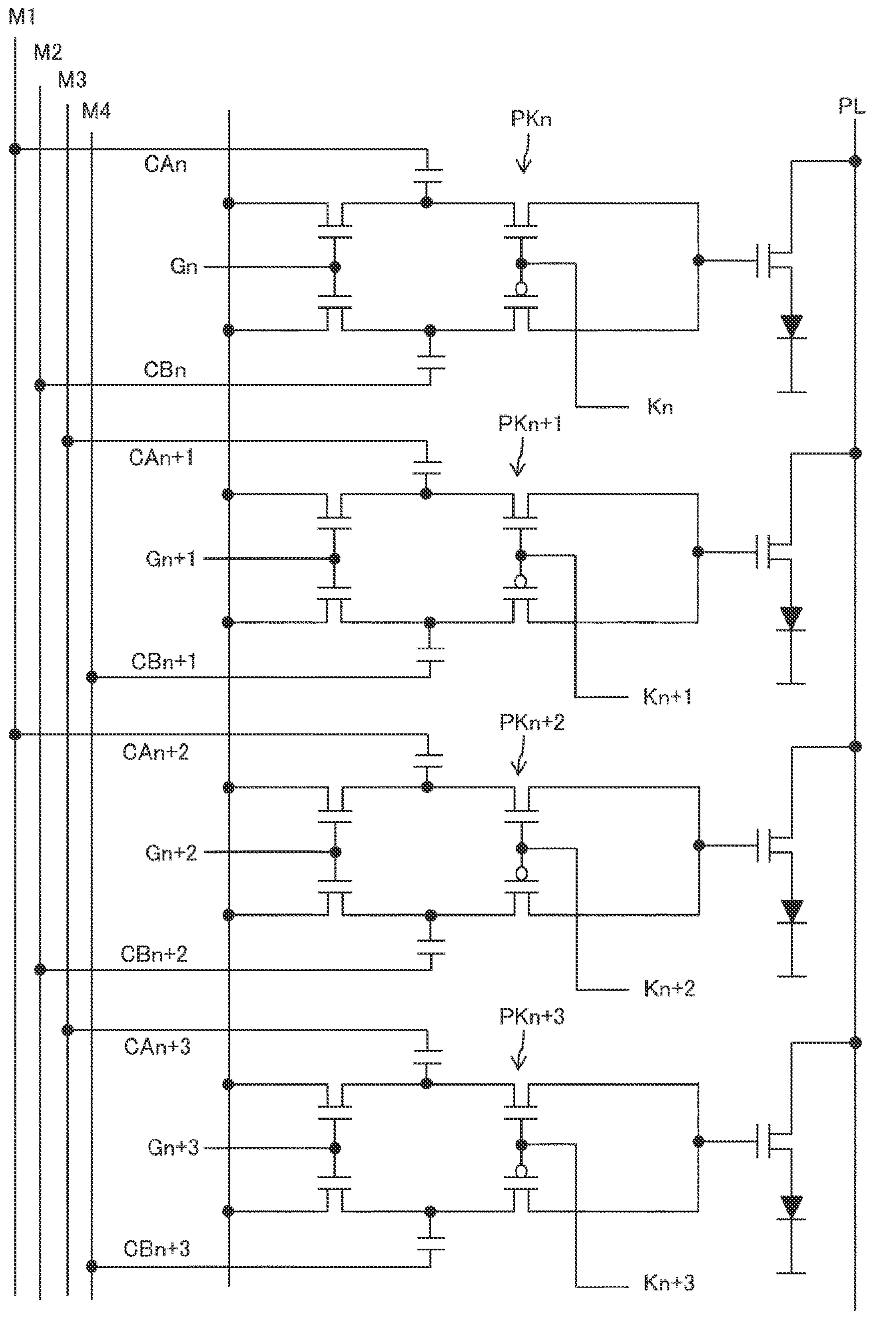
FIG. 8 is a circuit diagram showing another example of how main lines are connected to capacitor signal lines.
Figure 9:
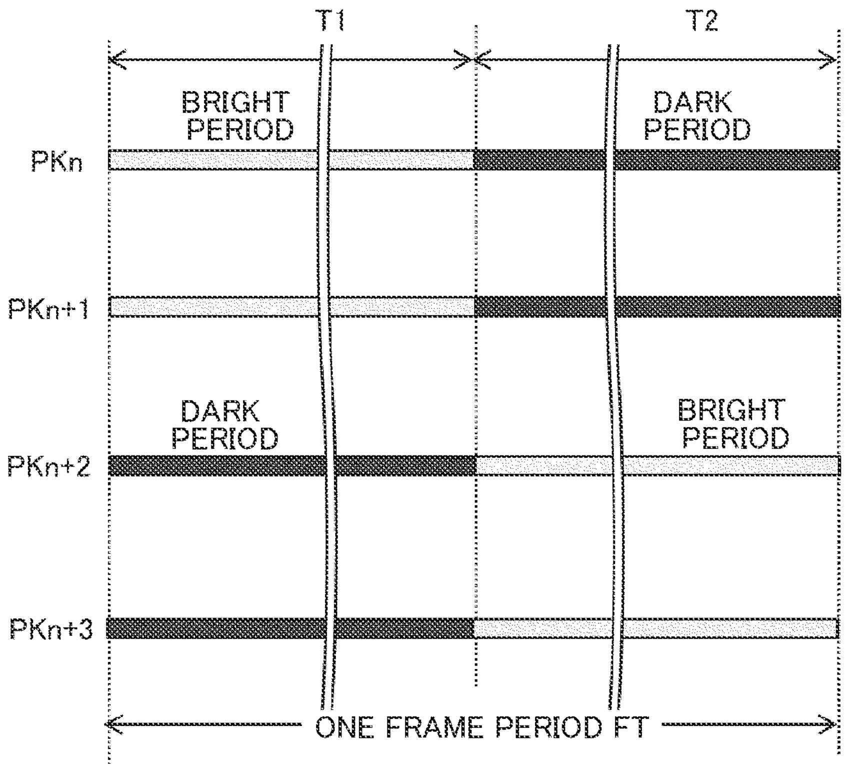
FIG. 9 is a schematic diagram of an exemplary display produced by pixel circuits.

FIG. 8 is a circuit diagram showing another example of how main lines are connected to capacitor signal lines. FIG. 9 is a schematic diagram of an exemplary display produced by pixel circuits.

FIG. 8 shows that the first capacitor signal line CAn and the first capacitor signal line CAn+2 are connected to the first main line M1, the second capacitor signal line CBn and the first capacitor signal line CBn+2 are connected to the second main line M2, the first capacitor signal line CAn+1 and the first capacitor signal line CAn+3 are connected to the third main line M3, and the second capacitor signal line CBn+1 and the second capacitor signal line CBn+3 are connected to the fourth main line M4.

These connections cause the first period T1 to be a bright period and the second period T2 to be a dark period for the pixel circuits PKn and PKn+1 and cause the first period T1 to be a dark period and the second period T2 to be a bright period for the pixel circuits PKn+2 and PKn+3, as shown in FIG. 9.

Half the period of the first capacitor signal CS1 and the second capacitor signal CS2 (the period in which the signal stays either HIGH or LOW), in Embodiment 1, is preferably shorter than the rising period of the electric current for the light-emitting element X. This setting is effective to restrain the degradation of the light-emitting element X. Half the period of the first capacitor signal CS1 and the second capacitor signal CS2 is, for example, equal to an integral multiple of the horizontal scan period (1H).

The frame frequency (rewrite frequency), in Embodiment 1, is equal to the frequency of the input video signal. The frequency of the switching signal KS (e.g., the reciprocal of T1=T2) is equal to N times the frame frequency (e.g., 2 to 8 times the frame frequency) where N is a natural number greater than or equal to 2.

A constant voltage diode may be inserted between the cathode of the light-emitting element X and the gate terminal Nd of the drive transistor TRx in Embodiment 1 shown in FIG. 2, to cap the luminance of the light-emitting element X.

Embodiment 2

Figure 10:
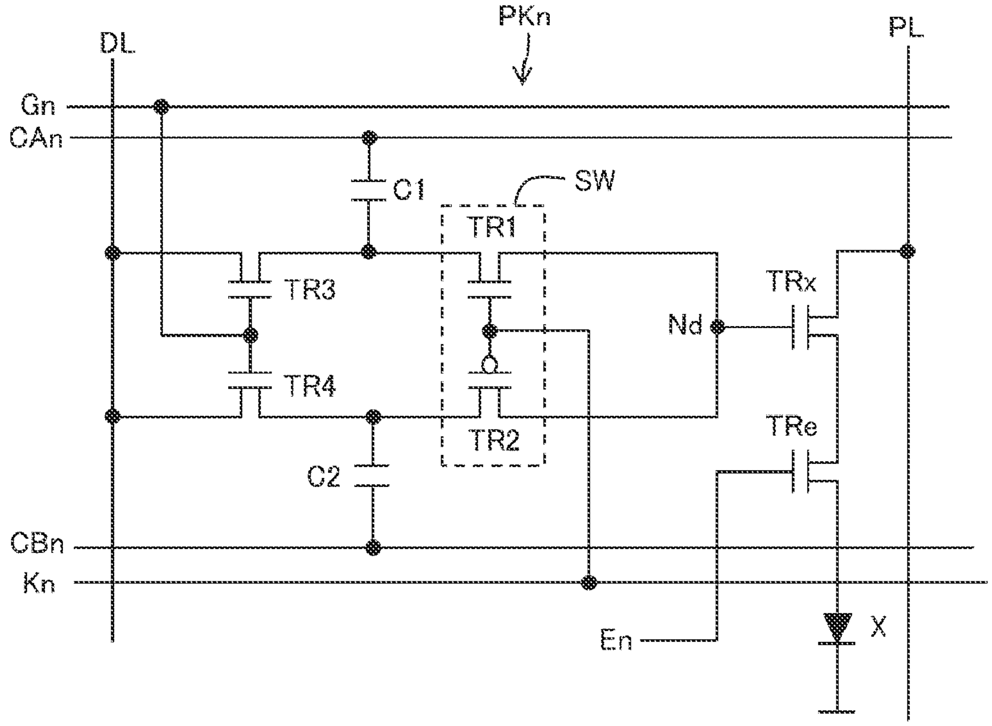
FIG. 10(*a*) is a pixel circuit diagram in accordance with Embodiment 2.
Figure 10:
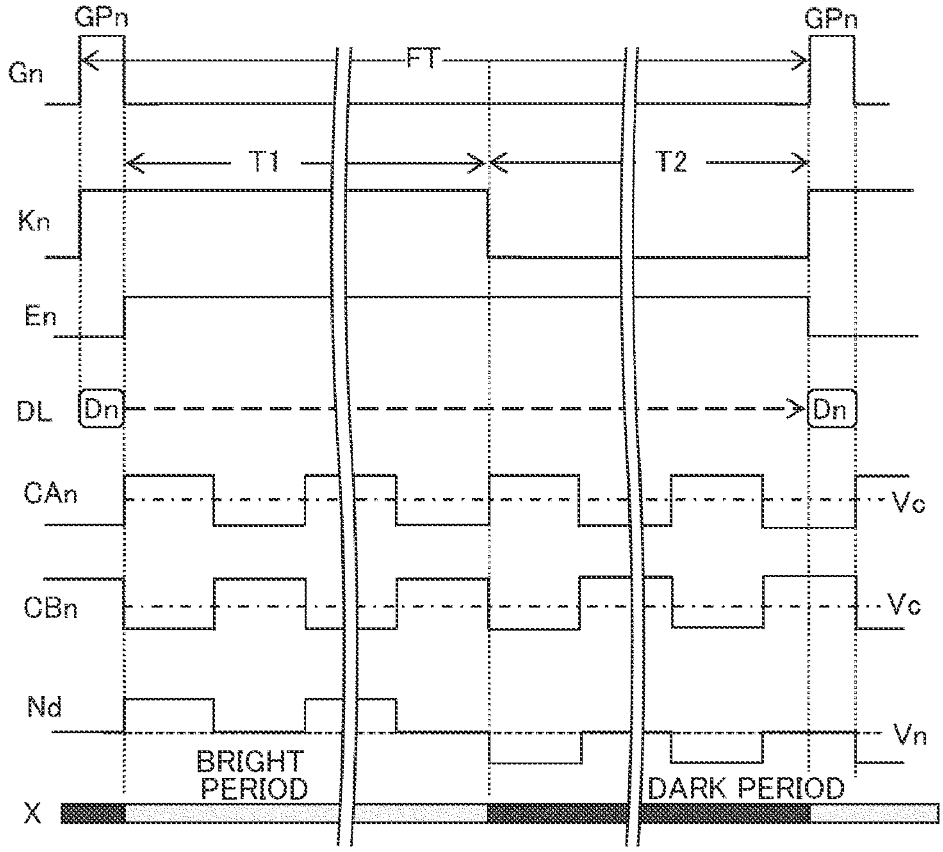

FIG. 10(*a*) is a pixel circuit diagram in accordance with Embodiment 2. FIG. 10(*b*) is a timing chart illustrating a method of driving a pixel circuit. In FIG. 10, the anode of the light-emitting element X may be connected to the source terminal of the drive transistor TRx via a light emission control transistor TRe, and the gate terminal of the light emission control transistor TRe may be connected to a light-emission control line En. The light-emission control line En goes active (HIGH) after the gate pulse GPn falls and goes inactive before a next gate pulse GPn rises. These settings prevent emission in the select period.

Embodiment 3

Figure 11:
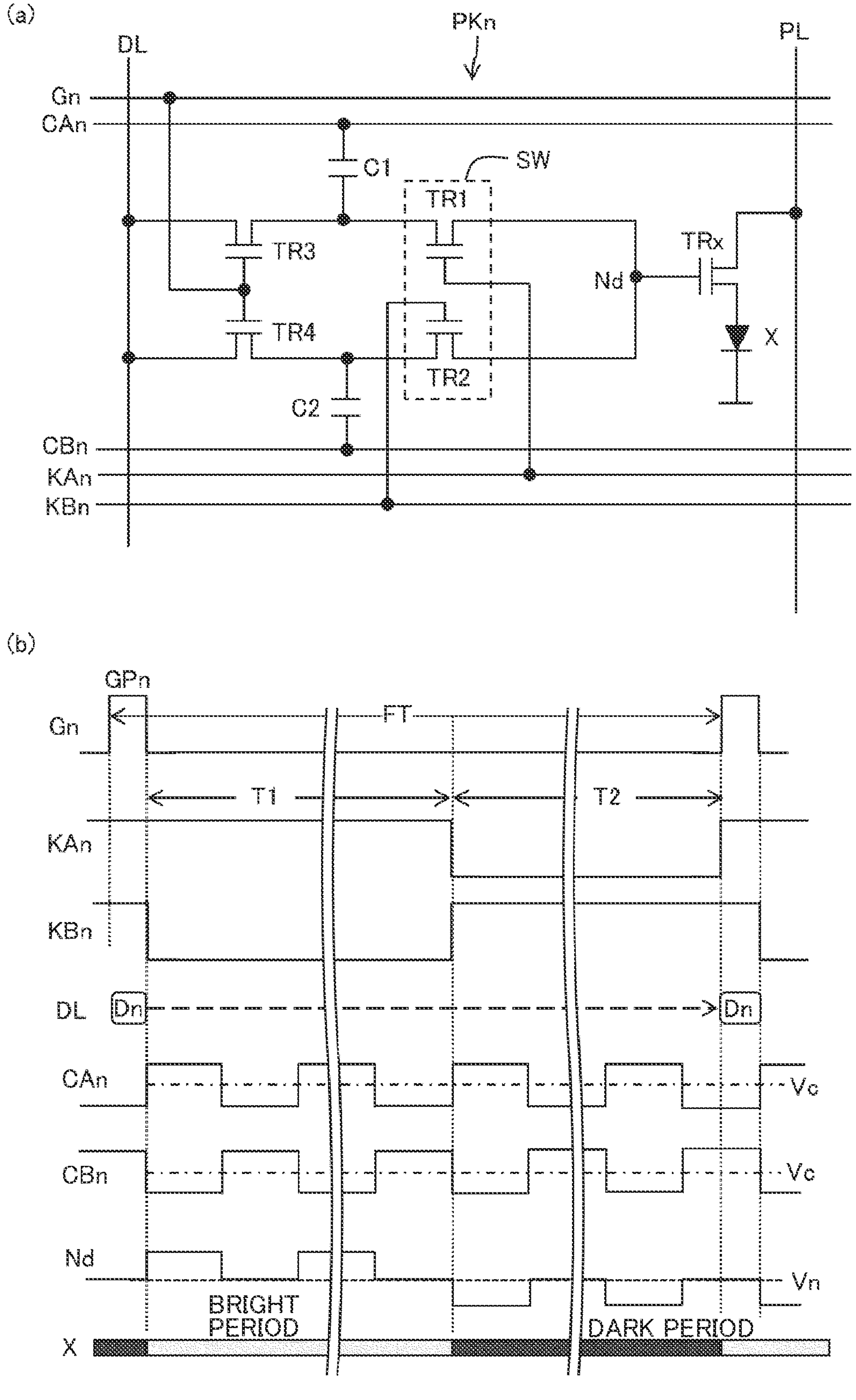
FIG. 11(*a*) is a circuit diagram of a pixel circuit constructed in accordance with Embodiment 3.

FIG. 11(*a*) is a circuit diagram of a pixel circuit constructed in accordance with Embodiment 3. FIG. 11(*b*) is a timing chart illustrating a method of driving the pixel circuit. The present embodiment, unlike Embodiment 1, uses a first transistor TR1 and a second transistor TR2 of the same polarity type. FIG. 11 shows that the gate terminal of the N-type, first transistor TR1 is connected to a switching signal line KAn and the gate terminal of the N-type, second transistor TR2 is connected to a switching signal line KBn.

The switching signal line KAn is active (HIGH) in the first period T1 and the select period of the scan signal line Gn (in the period in which the gate pulse GPn is rising) and goes inactive (LOW) at the end of the first period T1 (at the start of the second period T2). The switching signal line KBn is active (HIGH) in the select period of the scan signal line Gn, goes inactive (LOW) at the start of the first period T1, and goes active (HIGH) at the end of the first period T1 (at the start of the second period T2).

The description has so far assumed that both the first transistor TR1 and the second transistor TR2 are of N type. Alternatively, both the first transistor TR1 and the second transistor TR2 may be of P type. The first transistor TR1 and the second transistor TR2 being of the same polarity type in this manner simplify the process of producing the transistors.

Embodiment 4

Figure 12:
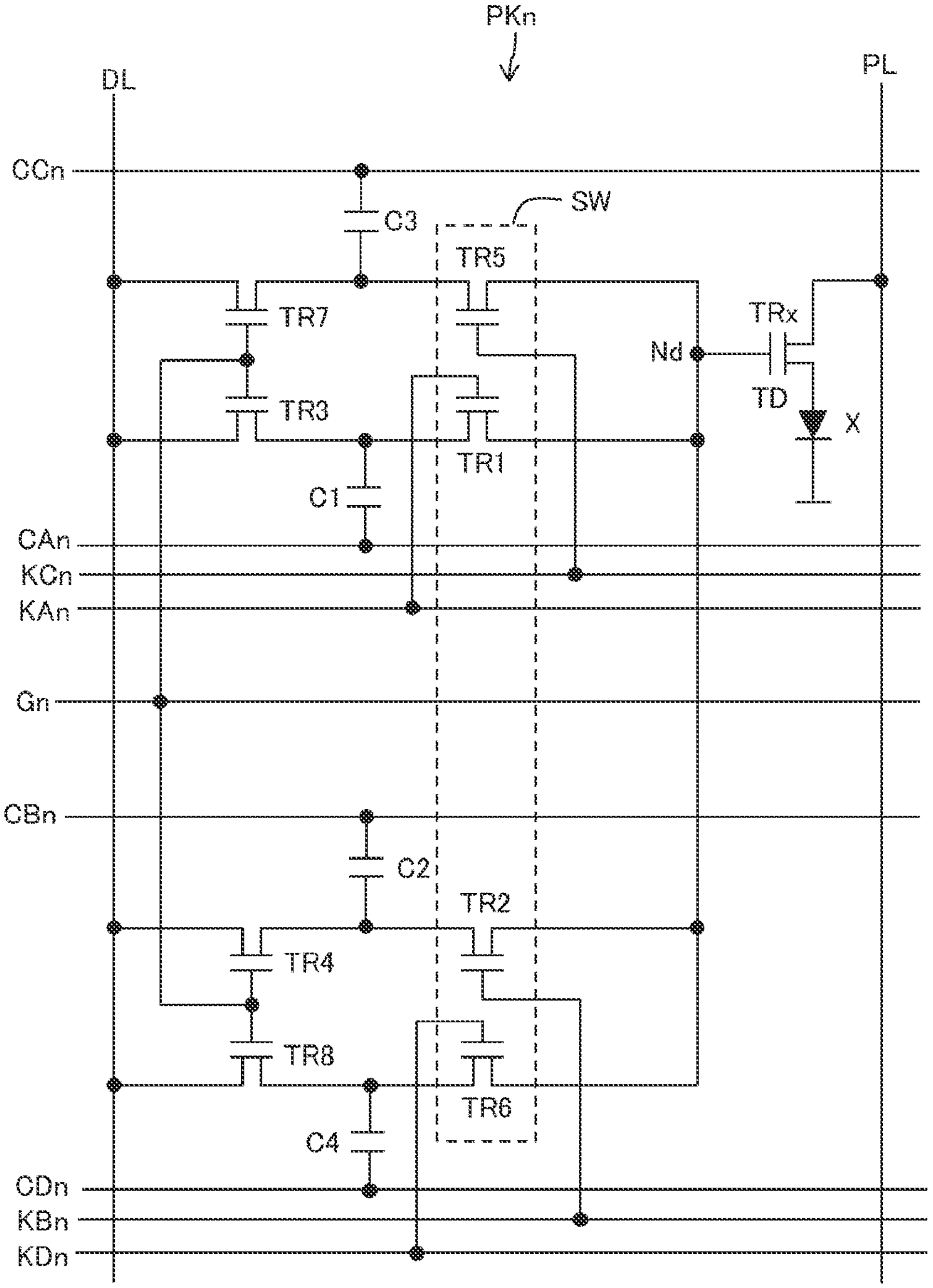
FIG. 12 is a circuit diagram of a pixel circuit constructed in accordance with Embodiment 4.

FIG. 12 is a circuit diagram of a pixel circuit constructed in accordance with Embodiment 4. There are provided a third capacitor signal line CCn and a fourth capacitor signal line CDn in FIG. 12. The pixel circuit PKn includes a light-emitting element X, a drive transistor TRx, a switching circuit SW, a first capacitive element C1, a second capacitive element C2, a third capacitive element C3, a fourth capacitive element C4, a N-type, third transistor TR3, a N-type, fourth transistor TR4, a N-type, seventh transistor TR7, and a N-type, eighth transistor TR8. The switching circuit SW includes a N-type, first transistor TR1, a N-type, second transistor TR2, a N-type, fifth transistor TR5, and a N-type, sixth transistor TR6. In Embodiment 4, the four retention capacitors, that is, the first capacitive element C1, the second capacitive element C2, the third capacitive element C3, and the fourth capacitive element C4, are connected to the control terminal of the common drive transistor TRx via the switching circuit SW.

The drive transistor TRx has a gate terminal Nd connected to a first electrode of the first capacitive element C1 via the first transistor TR1. The first electrode of the first capacitive element C1 is connected to the data signal line DL via the third transistor TR3. The first capacitive element C1 has a second electrode connected to the first capacitor signal line CAn.

The gate terminal Nd of the drive transistor TRx is connected to a first electrode of the second capacitive element C2 via the second transistor TR2. The first electrode of the second capacitive element C2 is connected to the data signal line DL via the fourth transistor TR4. The second capacitive element C2 has a second electrode connected to the second capacitor signal line CBn.

The gate terminal Nd of the drive transistor TRx is connected to a first electrode of a first capacitive element C3 via the fifth transistor TR5. The third capacitive element C3 has a first electrode connected to the data signal line DL via the seventh transistor TR7 and a second electrode connected to the third capacitor signal line CCn.

The gate terminal Nd of the drive transistor TRx is connected to a first electrode of the fourth capacitive element C4 via the sixth transistor TR6. The first electrode of the fourth capacitive element C4 is connected to the data signal line DL via the eighth transistor TR8. The fourth capacitive element C4 has a second electrode connected to the fourth capacitor signal line CDn.

The first transistor TR1 has a gate terminal connected to a switching signal line KAn. The second transistor TR2 has a gate terminal connected to a switching signal line KBn. The fifth transistor TR5 has a gate terminal connected to a switching signal line KCn. The sixth transistor TR6 has a gate terminal connected to a switching signal line KDn. The third transistor TR3, the fourth transistor TR4, the seventh transistor TR7, and the eighth transistor TR8 each have a gate terminal connected to the current-stage scan signal line Gn.

The first capacitor signal line CAn is connected to a first main line M1. The second capacitor signal line CBn is connected to a second main line M2. The third capacitor signal line CCn is connected to a fifth main line M5. The fourth capacitor signal line CDn is connected to a sixth main line M6.

Figure 13:
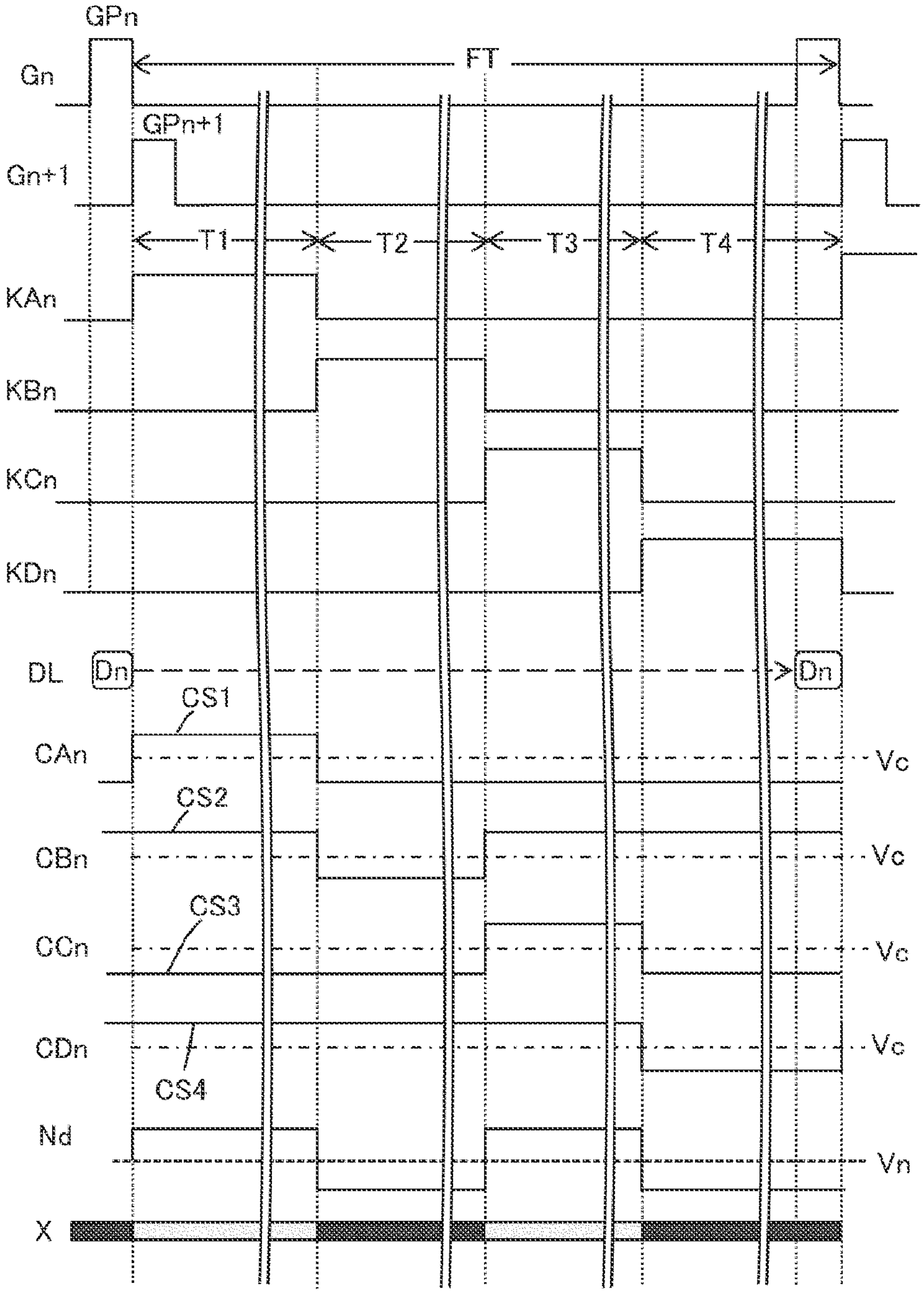
FIG. 13 is a timing chart illustrating a method of driving the pixel circuit in FIG. 12.

FIG. 13 is a timing chart illustrating a method of driving the pixel circuit in FIG. 12. FIG. 13 shows one frame period FT being divided into a first period T1 to a fourth period T4. Both a first capacitor signal CS1 and a third capacitor signal CS3 are at the first level (LOW), and both a second capacitor signal CS2 and a fourth capacitor signal CS4 are at the second level (HIGH), in the select period of the current-stage scan signal line Gn.

The switching signal line KAn has a HIGH electrical potential, and the first capacitor signal CS1 is HIGH, in the first period T1. The switching signal line KBn has a HIGH electrical potential, and the second capacitor signal CS2 is LOW, in the second period T2. The switching signal line KCn has a HIGH electrical potential, and the third capacitor signal CS3 is HIGH, in a third period T3. The switching signal line KDn has a HIGH electrical potential, and the fourth capacitor signal CS4 is LOW, in the fourth period T4. These settings cause the first period T1 to be a bright period, the second period T2 to be a dark period, the third period T3 to be a bright period, and the fourth period T4 to be a dark period, thereby achieving quadruple-speed drive.

Embodiment 5

Figure 14:
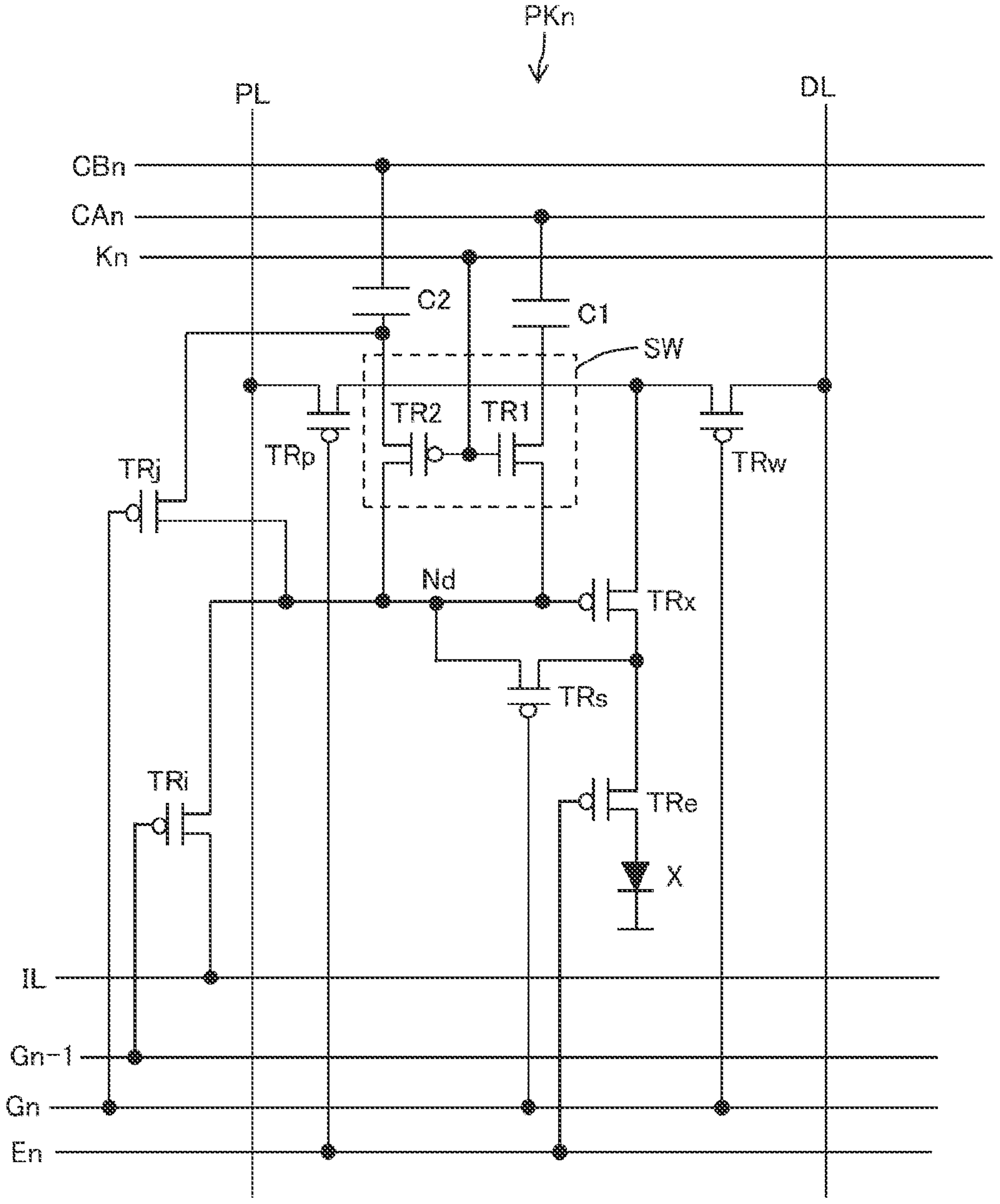
FIG. 14 is a circuit diagram of a pixel circuit constructed in accordance with Embodiment 5.
Figure 15:
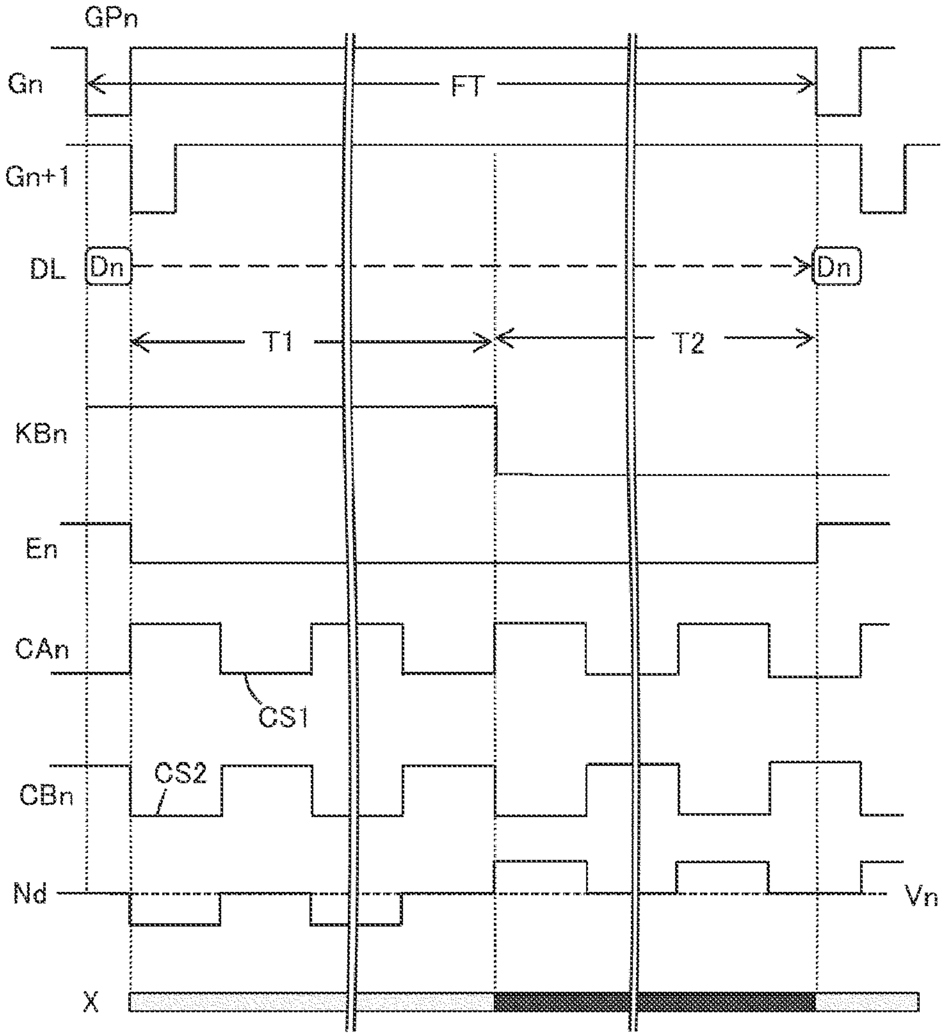
FIG. 15 is a timing chart illustrating a method of driving the pixel circuit in FIG. 14.

FIG. 14 is a circuit diagram of a pixel circuit constructed in accordance with Embodiment 5. FIG. 15 is a timing chart illustrating a method of driving the pixel circuit in FIG. 14. In FIG. 14, the pixel circuit PKn includes a light-emitting element X, a first capacitive element C1, a second capacitive element C2, an initialization transistor TRi having a gate terminal connected to the preceding-stage ((n−1)-th stage) scan signal line Gn−1, a compensation transistor TRs having a gate terminal connected to the current-stage (n-th stage) scan signal line Gn, a write control transistor TRw having a gate terminal connected to the current-stage (n-th stage) scan signal line Gn, a drive transistor TRx for controlling an electric current for the light-emitting element X, a power supply transistor TRp having a gate terminal connected to a light-emission control line EM (n-th stage), a light emission control transistor TRe having a gate terminal connected to the light-emission control line EM (n-th stage), and a setting transistor TRj having a gate terminal connected to the current-stage (n-th stage) scan signal line Gn.

The drive transistor TRx has a gate terminal Nd connected to an initialization power supply line IL via the initialization transistor TRi, a source terminal connected to the data signal line DL via the write control transistor TRw and also to a HIGH power supply line PL via the power supply transistor TRp, and a drain terminal connected to the anode of the light-emitting element X via the light emission control transistor TRe and also to the gate terminal Nd of the drive transistor TRx via the compensation transistor TRs. The initialization power supply line IL and the cathode (common electrode) of the light-emitting element X are fed with, for example, a LOW power supply voltage (ELVSS).

The gate terminal Nd of the drive transistor TRx is connected to a first electrode of the first capacitive element C1 via the first transistor TR1. The first capacitive element C1 has a second electrode connected to the first capacitor signal line CAn.

The gate terminal Nd of the drive transistor TRx is connected to a first electrode of the second capacitive element C2 via the second transistor TR2 and also via the setting transistor TRj. The second capacitive element C2 has a second electrode connected to the second capacitor signal line CBn.

The first transistor TR1 and the second transistor TR2 have the gate terminals thereof connected to the switching signal line Kn. The switching signal line Kn, the first capacitor signal line CAn, and the second capacitor signal line CBn extend parallel to the scan signal line Gn.

The switching signal KS fed to the switching signal line Kn, as shown in FIG. 15, is HIGH in the select period of the scan signal line Gn (the active period of the gate pulse GPn) that falls within a single frame period FT and also in the first period T1 that falls within a single frame period FT and that follows the select period of the scan signal line Gn and LOW in the second period T2 that falls within a single frame period FT and that follows the first period T1. As a result of this particular arrangement, the switching circuit SW connects the first capacitive element C1 to the control terminal Nd of the drive transistor TRx in the first period T1 and connects the second capacitive element C2 to the control terminal Nd of the drive transistor TRx in the second period T2.

In FIG. 15, the first capacitor signal CS1 is HIGH, and the second capacitor signal CS2 is LOW, in the select period of the scan signal line Gn. Therefore, the effective value on the gate terminal Nd of the drive transistor TRx is lower than a value Vn in the first period T1 and higher than the value Vn in the second period T2. The value Vn represents pixel data Dn.

Accordingly, when the pixel data Dn is grayscale, the effective current through the light-emitting element X is larger in the first period T1 than in the second period T2, and the effective luminance of the light-emitting element X is higher in the first period T1 than in the second period T2. The first period is a bright period, the second period is a dark period, and the average luminance of the light-emitting element X over the first period and the second period is the luminance of the pixel circuit PKn as reproduced from the pixel data Dn, in Embodiment 1.

Figure 16:
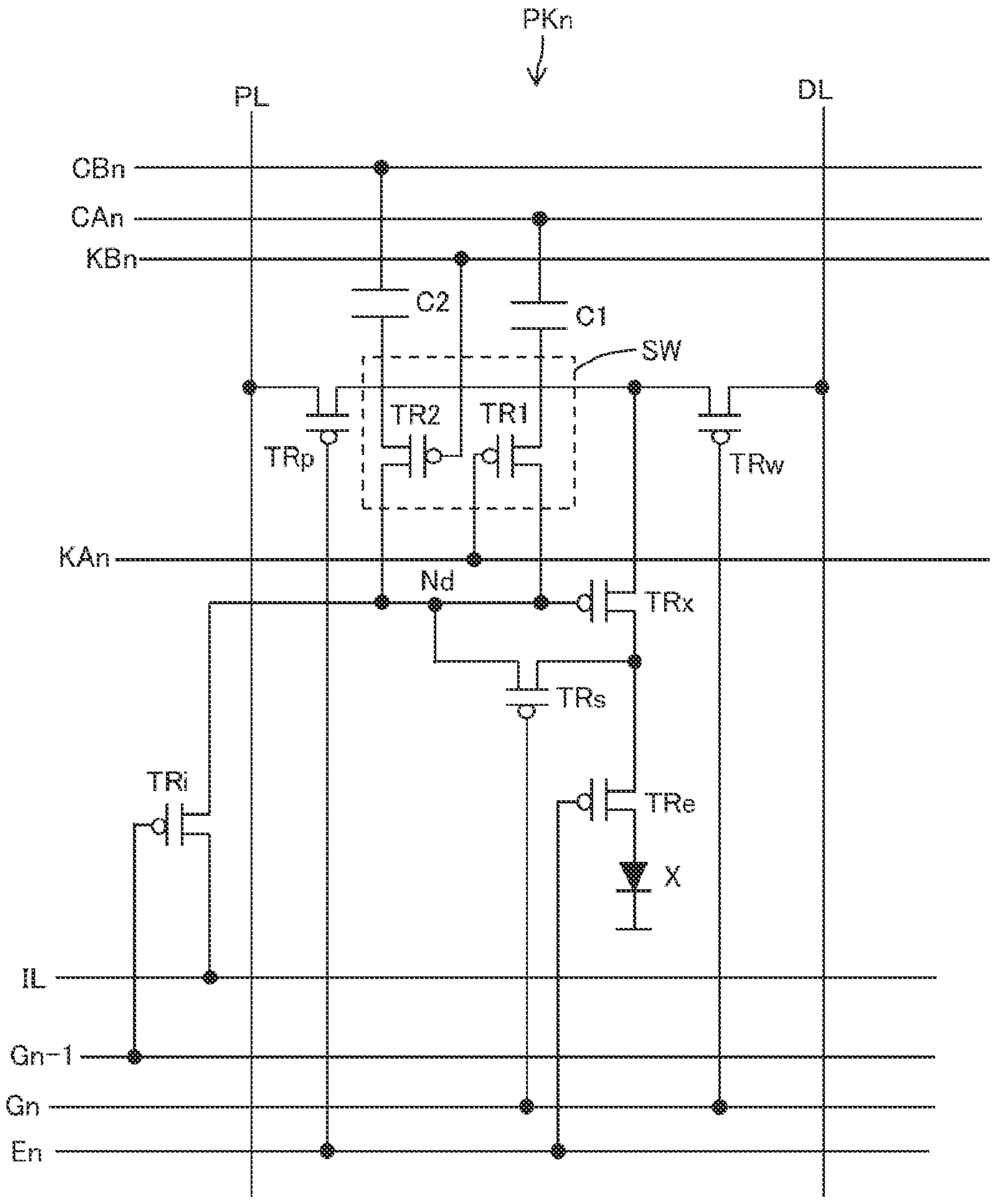
FIG. 16 is a circuit diagram of a variation example of the pixel circuit constructed in accordance with Embodiment 5.
Figure 17:
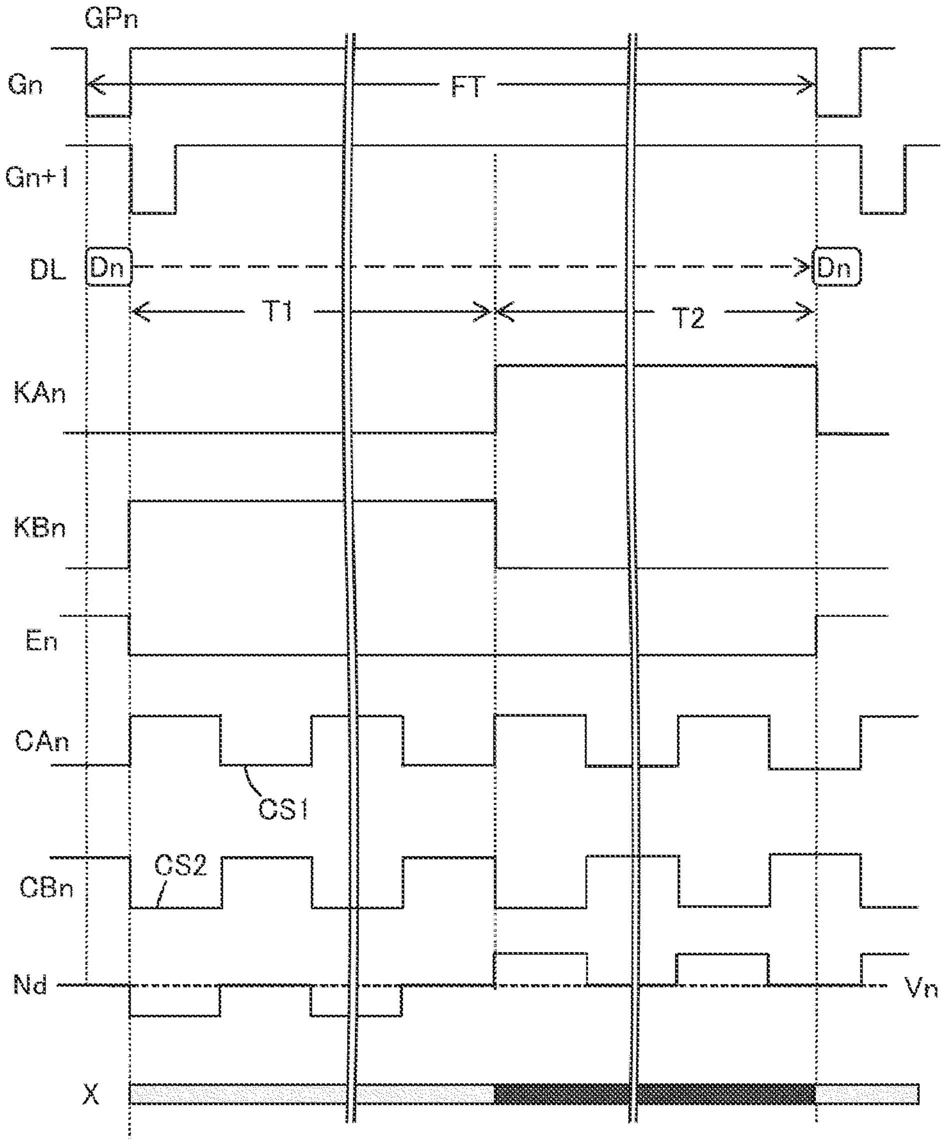
FIG. 17 is a timing chart illustrating a method of driving the pixel circuit in FIG. 16.

FIG. 16 is a circuit diagram of a variation example of the pixel circuit constructed in accordance with Embodiment 5. FIG. 17 is a timing chart illustrating a method of driving the pixel circuit in FIG. 16. In FIG. 16, both the first transistor TR1 and the second transistor TR2 have a P-channel like the other transistors in the pixel circuit (TRx, TRw, TRp, TRs, TRe, and TRi).

The electrical potential on the switching signal line KAn connected to the gate terminal of the first transistor TR1 is active (LOW) in the select period of the scan signal line Gn (in the period in which the gate pulse GPn is rising) and in the first period T1 and goes inactive (HIGH) at the end of the first period T1 (at the start of second period T2). The electrical potential on the switching signal line KBn connected to the gate terminal of the second transistor TR2 is active (LOW) in the select period of the scan signal line Gn, goes inactive (HIGH) at the start of the first period T1, and goes active (LOW) at the end of the first period T1 (at the start of the second period T2).

The structure in FIG. 16 simplifies the manufacturing process and obviates the need for the setting transistor TRj shown in FIG. 14, which allows for a size reduction of the pixel circuit.

Supplementary Description of Embodiments

Figure 18:
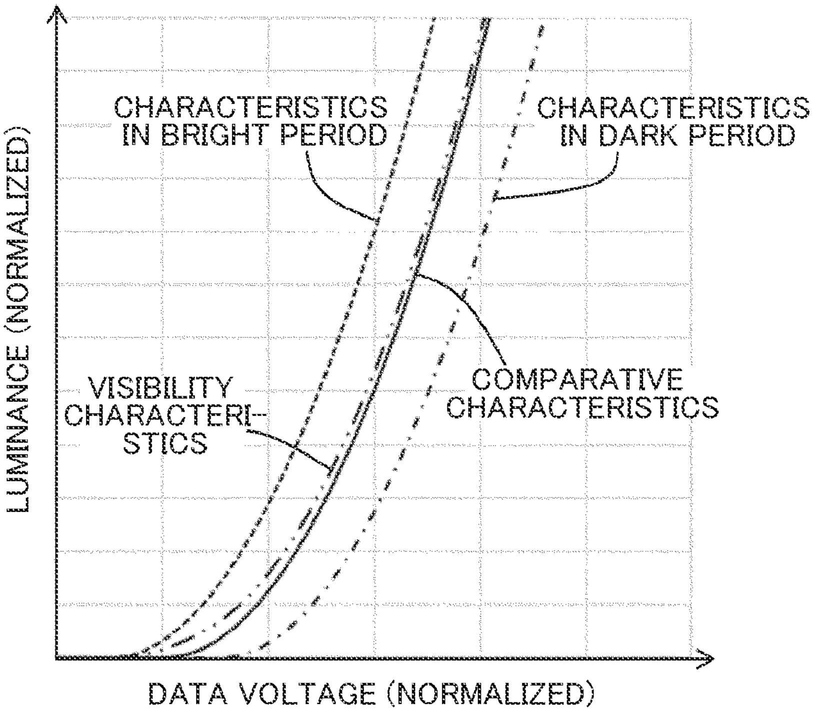
FIG. 18(*a*) is a graph of luminance versus data voltage characteristics in accordance with embodiments (when luminance is not capped at high gray levels).
Figure 18:
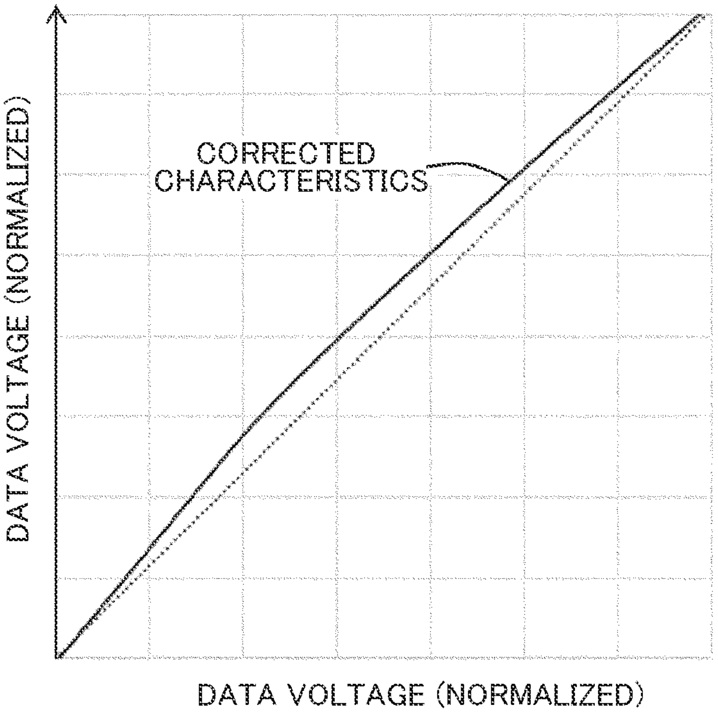

FIG. 18(*a*) is a graph of luminance versus data voltage characteristics in accordance with embodiments (when luminance is not capped at high gray levels). FIG. 18(*b*) is a graph representing corrected data voltage characteristics (when luminance is not capped at high gray levels). FIG. 18(*a*) demonstrates that the total sum of the characteristics in the bright period and the characteristics in the dark period is equivalent to visibility characteristics in the embodiments where luminance is distributed temporally, and these visibility characteristics change more gently at low gray levels than do the comparative characteristics obtained when luminance is not distributed temporally. Voltage is hence more easily controllable at low gray levels, which allows for improvements in display quality. FIG. 18(*b*) demonstrates that voltage is controlled almost linearly across the entire range of gray levels in the embodiments similarly to the case where luminance is not distributed temporally (broken line).

Figure 19:
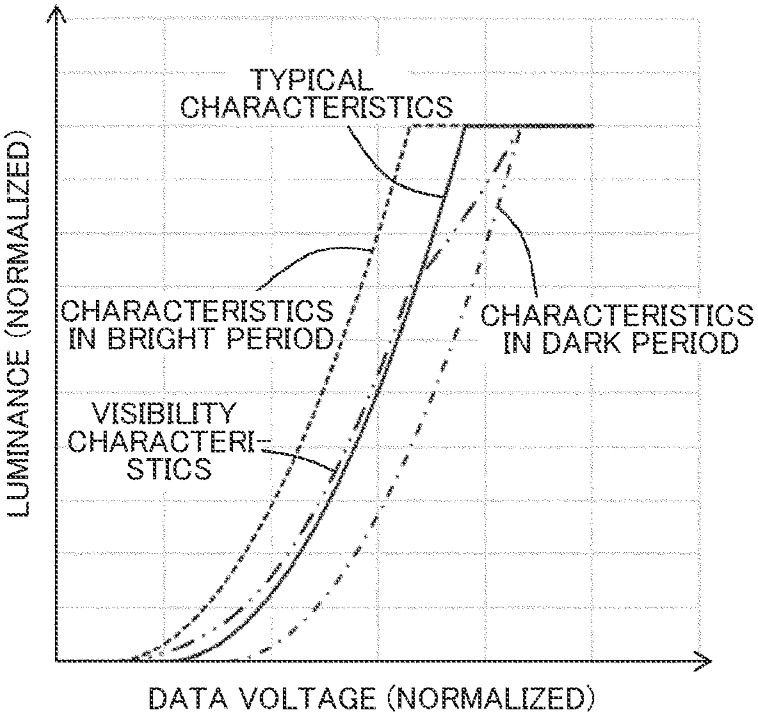
FIG. 19(*a*) is a graph of luminance versus data voltage characteristics in accordance with embodiments (when luminance is capped at high gray levels).
Figure 19:
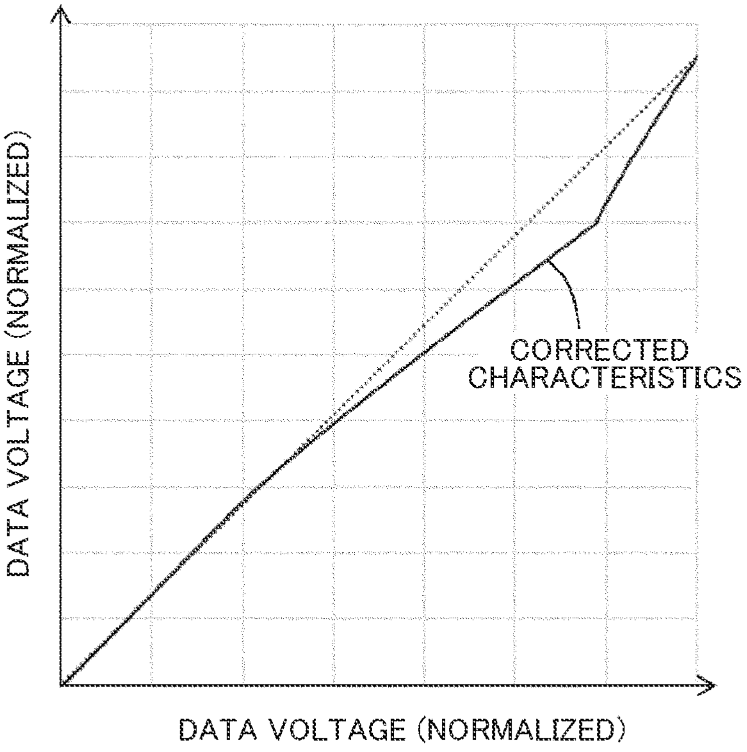

FIG. 19(*a*) is a graph of luminance versus data voltage characteristics in accordance with embodiments (when luminance is capped at high gray levels). FIG. 19(*b*) is a graph representing corrected data voltage characteristics (when luminance is capped at high gray levels). FIG. 19(*a*) demonstrates that the total sum of the characteristics in the bright period and the characteristics in the dark period is equivalent to visibility characteristics in the embodiments where luminance is distributed temporally, and these visibility characteristics change more gently at low gray levels than do the comparative characteristics obtained when luminance is not distributed temporally. Voltage is hence more easily controllable at low gray levels, which allows for improvements in display quality. FIG. 19(*b*) demonstrates that the slope is larger at high gray levels than in the case where luminance is not distributed temporally (broken line). Voltage is hence more easily controllable at high gray levels, which allows for improvements in display quality.

The embodiments and examples described so far are for illustrative purposes only and by no means limit the scope of the disclosure. It is obvious to the person skilled in the art that many modifications and variations are possible based on the description.

The invention claimed is:

1. A display device comprising:

a plurality of data signal lines connected to a data signal line drive circuit;

a plurality of scan signal lines connected to a scan signal line drive circuit and intersecting with the plurality of data signal lines;

a plurality of pixel circuits at respective intersections of the plurality of data signal lines and the plurality of scan signal lines; and a switching signal generation circuit, wherein each of the plurality of pixel circuits includes:

a current-driven light-emitting element;

a drive transistor configured to control an electric current for the light-emitting element;

a switching circuit; and a first capacitive element and a second capacitive element both connected to the switching circuit, the switching circuit connects the first capacitive element to a control terminal of the drive transistor in a first period that falls within a single frame period and connects the second capacitive element to the control terminal of the drive transistor in a second period that falls within the single frame period and that follows the first period, the switching circuit includes a first transistor and a second transistor, the control terminal of the drive transistor is connected to the first capacitive element via the first transistor, and the first capacitive element is connected to a first capacitor signal line, the control terminal of the drive transistor is connected to the second capacitive element via the second transistor, and the second capacitive element is connected to a second capacitor signal line, the first capacitor signal line and the second capacitor signal line extend parallel to the plurality of scan signal lines, the control terminal of the drive transistor is connected either to the first capacitive element via the first transistor or to the second capacitive element via the second transistor, by a switching signal input from the switching signal generation circuit to the switching circuit, a first capacitor signal applied to the first capacitor signal line and a second capacitor signal applied to the second capacitor signal line are signals which toggle between a first level and a second level, the first capacitor signal is at the first level, and the second capacitor signal is at the second level, in a select period of one of the plurality of scan signal lines that is associated with a current stage, the first capacitor signal goes to the second level in at least a part of the first period, and the second capacitor signal goes to the first level in at least a part of the second period.

2. The display device according to claim 1, wherein pixel data is simultaneously written to the first capacitive element and the second capacitive element in the select period of one of the plurality of scan signal lines that is associated with the current stage.

3. The display device according to claim 1, wherein the plurality of pixel circuits further includes a write transistor and a compensation transistor, control terminals of the write transistor and the compensation transistor are connected to one of the plurality of scan signal lines that is associated with the current stage, one of conduction terminals of the drive transistor is connected to an associated one of the plurality of data signal lines via the write transistor, another one of the conduction terminals of the drive transistor is connected to the control terminal of the drive transistor via the compensation transistor, and the first capacitive element and the second capacitive element are electrically connected to the control terminal of the drive transistor in the select period of one of the plurality of scan signal lines that is associated with the current stage.

4. The display device according to claim 1, wherein the plurality of pixel circuits further includes a third transistor and a fourth transistor, control terminals of the third transistor and the fourth transistor are connected to one of the plurality of scan signal lines that is associated with the current stage, one of conduction terminals of the third transistor is connected to the first capacitive element and the first transistor, one of conduction terminals of the fourth transistor is connected to the second capacitive element and the second transistor, and other conduction terminals of the third transistor and the fourth transistor are connected to an associated one of the plurality of data signal lines.

5. The display device according to claim 1, further comprising a first main line connected to the first capacitor signal line and a second main line connected to the second capacitor signal line.

6. A display device comprising:

a plurality of data signal lines connected to a data signal line drive circuit;

a plurality of scan signal lines connected to a scan signal line drive circuit and intersecting with the plurality of data signal lines;

a plurality of pixel circuits at respective intersections of the plurality of data signal lines and the plurality of scan signal lines;

a switching signal generation circuit;

a first main line and a second main line; and a third main line and a fourth main line, wherein each of the plurality of pixel circuits includes:

a current-driven light-emitting element;

a drive transistor configured to control an electric current for the light-emitting element;

a switching circuit; and a first capacitive element and a second capacitive element both connected to the switching circuit, the switching circuit connects the first capacitive element to a control terminal of the drive transistor in a first period that falls within a single frame period and connects the second capacitive element to the control terminal of the drive transistor in a second period that falls within the single frame period and that follows the first period, the switching circuit includes a first transistor and a second transistor, the control terminal of the drive transistor is connected to the first capacitive element via the first transistor, and the first capacitive element is connected to a first capacitor signal line, the control terminal of the drive transistor is connected to the second capacitive element via the second transistor, and the second capacitive element is connected to a second capacitor signal line, the first capacitor signal line and the second capacitor signal line extend parallel to the plurality of scan signal lines, the control terminal of the drive transistor is connected either to the first capacitive element via the first transistor or to the second capacitive element via the second transistor, by a switching signal input from the switching signal generation circuit to the switching circuit, the first main line is connected to the first capacitor signal line of one of the plurality of pixel circuits that is associated with a current stage, the second main line is connected to the second capacitor signal line of the one of the plurality of pixel circuits that is associated with the current stage, the third main line is connected to the first capacitor signal line of one of the plurality of pixel circuits that is associated with a succeeding stage, and the fourth main line is connected to the second capacitor signal line of the one of the plurality of pixel circuits that is associated with the succeeding stage.

7. The display device according to claim 4, wherein each of the plurality of pixel circuits further includes a third capacitive element and a fourth capacitive element, the switching circuit further includes a fifth transistor and a sixth transistor, the control terminal of the drive transistor is connected to the third capacitive element via the fifth transistor, and the third capacitive element is connected to a third capacitor signal line, and the control terminal of the drive transistor is connected to the fourth capacitive element via the sixth transistor, and the fourth capacitive element is connected to a fourth capacitor signal line.

8. The display device according to claim 7, wherein each of the plurality of pixel circuits further includes a seventh transistor and an eighth transistor, control terminals of the seventh transistor and the eighth transistor are connected to the one of the plurality of scan signal lines that is associated with the current stage, one of conduction terminals of the seventh transistor is connected to the third capacitive element and the fifth transistor, one of conduction terminals of the eighth transistor is connected to the fourth capacitive element and the sixth transistor, and other conduction terminals of the seventh transistor and the eighth transistor are connected to the associated one of the plurality of data signal lines.

9. The display device according to claim 3, further comprising an initialization transistor of which a control terminal is connected to one of the plurality of scan signal lines that is associated with a preceding stage, wherein the control terminal of the drive transistor is connected to an initialization power supply line via the initialization transistor.

10. The display device according to claim 1, wherein the switching circuit connects the control terminal of the drive transistor to the first capacitive element and the second capacitive element in a select period of one of the plurality of scan signal lines that is associated with a current stage.

11. The display device according to claim 1, wherein the first transistor and the second transistor have different channel polarities.

12. The display device according to claim 11, wherein an identical switching signal is input to control terminals of the first transistor and the second transistor.

13. The display device according to claim 1, wherein the first transistor and the second transistor have an identical channel polarity.

14. A display device comprising:

a plurality of data signal lines connected to a data signal line drive circuit;

a plurality of scan signal lines connected to a scan signal line drive circuit and intersecting with the plurality of data signal lines; and a plurality of pixel circuits at respective intersections of the plurality of data signal lines and the plurality of scan signal lines, wherein each of the plurality of pixel circuits includes:

a current-driven light-emitting element;

a drive transistor configured to control an electric current for the light-emitting element;

a switching circuit; and a first capacitive element and a second capacitive element both connected to the switching circuit, the switching circuit connects the first capacitive element to a control terminal of the drive transistor in a first period that falls within a single frame period and connects the second capacitive element to the control terminal of the drive transistor in a second period that falls within the single frame period and that follows the first period, and the control terminal of the drive transistor is connected to a constant voltage source via a constant voltage diode.

15. The display device according to claim 6, wherein a first capacitor signal applied from the first main line to the first capacitor signal line that is associated with the current stage and a second capacitor signal applied from the second main line to the second capacitor signal line that is associated with the current stage have different phases.

16. The display device according to claim 6, wherein a third capacitor signal applied from the third main line to the first capacitor signal line that is associated with the succeeding stage and a fourth capacitor signal applied from the fourth main line to the second capacitor signal line that is associated with the succeeding stage have different phases.

17. The display device according to claim 6, wherein a first capacitor signal applied from the first main line to the first capacitor signal line that is associated with the current stage and a third capacitor signal applied from the third main line to the first capacitor signal line that is associated with the succeeding stage have different phases.

18. The display device according to claim 1, wherein the first capacitor signal and the second capacitor signal are signals which periodically toggle between the first level and the second level.

* * * * *